US009002553B2

(12) United States Patent
Kamoshida

(10) Patent No.: US 9,002,553 B2
(45) Date of Patent: Apr. 7, 2015

(54) ENGINE STARTING CONTROL DEVICE FOR HYBRID VEHICLE

(75) Inventor: Toru Kamoshida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 737 days.

(21) Appl. No.: 13/384,968

(22) PCT Filed: Aug. 6, 2010

(86) PCT No.: PCT/JP2010/063379
§ 371 (c)(1),
(2), (4) Date: Jan. 19, 2012

(87) PCT Pub. No.: WO2011/021517
PCT Pub. Date: Feb. 24, 2011

(65) Prior Publication Data
US 2012/0116629 A1 May 10, 2012

(30) Foreign Application Priority Data

Aug. 21, 2009 (JP) ................. 2009-191979

(51) Int. Cl.
F02N 11/08 (2006.01)
F02N 15/02 (2006.01)
(Continued)

(52) U.S. Cl.
CPC ............ F02D 29/02 (2013.01); B60W 20/40 (2013.01); B60W 2510/0642 (2013.01); B60W 2710/0644 (2013.01); B60K 6/36 (2013.01); B60K 6/365 (2013.01); B60K 6/48 (2013.01); B60K 6/547 (2013.01); B60L 11/14 (2013.01);
(Continued)

(58) Field of Classification Search
USPC .......................................................... 701/22
See application file for complete search history.

(56) References Cited

U.S. PATENT DOCUMENTS 8,065,047 B2 * 11/2011 Hasegawa et al. ............... 701/22
8,388,493 B2 * 3/2013 Henneken et al. ................. 477/5
(Continued)

FOREIGN PATENT DOCUMENTS

JP 2005-186931 A 7/2005
JP 2007-069790 A 3/2007
(Continued)

OTHER PUBLICATIONS

Japanese Office Action dated Aug. 6, 2013, issued in corresponding Japanese Patent Application No. 2011-527635.
(Continued)

Primary Examiner — Shelley Chen
(74) Attorney, Agent, or Firm — Westerman, Hattori, Daniels & Adrian, LLP

(57) ABSTRACT

Upon starting an internal combustion engine for a hybrid vehicle, when the motor revolution speed, transmitted to an engagement device, is equal to or lower than the idle revolution speed of the internal combustion engine, if an engagement ratio is less than 1, the lower the engagement ratio is, the larger the engagement capacity is set, and if the engagement ratio is 1 or more, the engagement capacity is set to 0, wherein the engagement ratio is defined by a ratio of the internal combustion engine revolution speed with respect to the motor revolution speed. When the motor revolution speed is greater than the idle revolution speed, if an idle revolution ratio is less than 1, the lower the idle revolution ratio is, the larger the engagement capacity is set, and if the idle revolution ratio is 1 or more, the engagement capacity is set to 0.

7 Claims, 8 Drawing Sheets

(51) Int. Cl.
*B60W 20/00* (2006.01)
*B60W 10/06* (2006.01)
*B60W 30/192* (2012.01)
*F02D 29/02* (2006.01)
*B60K 6/36* (2007.10)
*B60K 6/365* (2007.10)
*B60K 6/48* (2007.10)
*B60K 6/547* (2007.10)
*B60L 11/14* (2006.01)
*B60W 10/08* (2006.01)

(52) U.S. Cl.
CPC ...... *B60L2240/421* (2013.01); *B60L 2240/441* (2013.01); *B60L 2240/486* (2013.01); *B60L 2240/662* (2013.01); *B60W 10/06* (2013.01); *B60W 10/08* (2013.01); *B60W 20/00* (2013.01); *B60W 2510/0638* (2013.01); *B60W 2510/081* (2013.01); *B60W 2550/12* (2013.01); *B60Y 2400/428* (2013.01); *F02N 11/08* (2013.01); *F02N 15/022* (2013.01); *F02N 2300/2002* (2013.01); *Y02T 10/6221* (2013.01); *Y02T 10/6286* (2013.01); *Y02T 10/642* (2013.01); *Y02T 10/7077* (2013.01); *Y02T 10/7291* (2013.01); *Y02T 90/16* (2013.01); *Y10S 903/905* (2013.01)

(56) References Cited

U.S. PATENT DOCUMENTS

| | | | | |
|---|---|---|---|---|
| 2001/0020789 | A1* | 9/2001 | Nakashima | 290/40 C |
| 2007/0246273 | A1* | 10/2007 | Tenbrock et al. | 180/65.2 |
| 2007/0275818 | A1 | 11/2007 | Kouno | |
| 2009/0143189 | A1* | 6/2009 | Hasegawa et al. | 477/5 |
| 2009/0143950 | A1* | 6/2009 | Hasegawa et al. | 701/68 |
| 2009/0312895 | A1* | 12/2009 | Kim et al. | 701/22 |
| 2010/0072958 | A1* | 3/2010 | Wada et al. | 322/22 |

FOREIGN PATENT DOCUMENTS

| | | |
|---|---|---|
| JP | 2007-126082 A | 5/2007 |
| JP | 3912368 B2 | 5/2007 |
| JP | 2007-326557 A | 12/2007 |
| JP | 2008-001349 A | 1/2008 |
| JP | 2009143526 A * | 7/2009 |

OTHER PUBLICATIONS

International Search Report of PCT/JP2010/063379, mailing date Sep. 14, 2010.

* cited by examiner

ENGINE STARTING CONTROL DEVICE FOR HYBRID VEHICLE

TECHNICAL FIELD

The present invention relates to an engine starting control device for starting an engine in a hybrid vehicle mounted with an internal combustion engine (hereinafter, referred to as "engine") and an electric motor (motor/generator). Hereinafter, referred to as "motor") and installed with an engagement device between the engine and the motor.

BACKGROUND ART

Hitherto, as techniques for starting the engine when the above-mentioned hybrid vehicle is travelling driven by a driving force from the motor only (hereinafter, referred to as "electric travelling"), the following ones are known.

Patent document 1 has disclosed an engine starting method for a hybrid vehicle. According to the engine starting method, an engine starting command is issued when an engine revolution speed reaches the startable revolution speed, and thereafter, vibrations accompanied with torque fluctuation generated in starting the engine is suppressed by gradually reducing an engagement force of a clutch serving as an engagement device.

Patent document 2 has disclosed an engine starting control device for a hybrid vehicle provided with a hybrid driving system configured by interposing a first clutch between the engine and the motor as an engagement device and by interposing a second clutch between the motor and driving wheels. According to the engine starting control device, when the engine is started during electric travelling in which the hybrid vehicle is driven by the motor, a required driving force is achieved within a range of driving force which can be achieved by the electric travelling; moreover, by slide-fastening the first clutch to perform the engine starting, the driving force can be prevented from getting lost against the willing of a driver at the time of the engine starting.

PRIOR ART REFERENCES

Patent Documents

Patent document 1: Published Japanese Patent No. 3912368
Patent document 2: Published Japanese Patent Application No. 2007-69790

SUMMARY OF THE INVENTION

Problems to be Solved by the Invention

However, in the above-mentioned conventional techniques, there are the following problems.

In the technique of Patent document 1, after the engine starting command is issued, the engagement force of the clutch is gradually reduced; therefore, if a load is increased before the engine is actually started, the engine revolution speed will be decreased, which may prevent the engine from being started.

In the technique of Patent document 2, in order to achieve the request driving force necessary for starting the engine, a transmittable torque capacity of the first clutch is defined as a torque capacity capable of transmitting a minimum torque required for starting the engine, and a sum of the torque capacity and a torque for generating a desired driving force is set as an output of the motor. Thereby, it is necessary to compute the transmittable torque capacity of the first clutch, which in turn increases the processing of the engine starting control device.

The present invention has been accomplished in view of the aforementioned problems, and it is therefore an object of the present invention to provide an engine starting control device for a hybrid vehicle capable of preventing an engine revolution speed from being decreased even a load is increased before an engine is actually started after the issue of an engine starting command and saving the necessity of computing a transmittable torque capacity (engagement capacity) of an engagement device required for starting the engine.

Means for Solving the Problems

The present invention provides an engine starting control device for a hybrid vehicle provided with an internal combustion engine and a motor as power sources which engages an engagement device installed between the motor and the internal combustion engine and starts the internal combustion engine with a power force from the electric motor during an electric travelling of the hybrid vehicle driven by a driving force from the motor only. The engine starting control device of the present invention is divided into 3 aspects according to the starting control method.

In a first aspect of the present invention, when an engine starting command is issued during the electric travelling, the engine starting control device determines whether or not a motor revolution speed (Ms) transmitted from the motor to the engagement device is equal to or lower than an idle revolution speed (Ei) of the internal combustion engine, if the motor revolution speed (Ms) is determined to be equal to or lower than the idle revolution speed (Ei), the engine starting control device controls the starting of the internal combustion engine at a low speed mode in which an engagement capacity is set greater as an engagement ratio defined as a ratio of an internal combustion engine revolution speed (Ne) with respect to the motor revolution speed (Ms) becomes smaller if the engagement ratio is smaller than 1 and the engagement capacity is set to 0 if the engagement ratio is equal to or greater than 1, and if the motor revolution speed (Ms) is determined to be greater than the idle revolution speed (Ei), the engine starting control device controls the starting of the internal combustion engine at a high speed mode in which the engagement capacity is set greater as an idle revolution ratio defined as a ratio of the internal combustion engine revolution speed (Ne) with respect to the idle revolution speed (Ei) becomes smaller if the idle revolution ratio is smaller than 1 and the engagement capacity is set to 0 if the idle revolution ratio is equal to or greater than 1.

In a second aspect of the present invention, when an engine starting command is issued during the electric travelling, the engine starting control device determines whether or not a motor revolution speed (Ms) transmitted from the motor to the engagement device is equal to or lower than an idle revolution speed (Ei), if the motor revolution speed (Ms) is determined to be equal to or lower than the idle revolution speed (Ei), the engine starting control device controls the starting of the internal combustion engine at a low speed mode in which an engagement capacity is set greater as an engagement ratio defined as a ratio of an internal combustion engine revolution speed (Ne) with respect to the motor revolution speed (Ms) becomes smaller if the engagement ratio is smaller than 1 and the engagement capacity is set to 0 if the engagement ratio is equal to or greater than 1.

In a third aspect of the present invention, when an engine starting command is issued during the electric travelling, the engine starting control device determines whether or not a motor revolution speed (Ms) transmitted from the motor to the engagement device is equal to or lower than an idle revolution speed (Ei), if the motor revolution speed (Ms) is determined to be greater than the idle revolution speed (Ei), the engine starting control device controls the starting of the internal combustion engine at a high speed mode in which the engagement capacity is set greater as an idle revolution ratio defined as a ratio of the internal combustion engine revolution speed (Ne) with respect to the idle revolution speed (Ei) becomes smaller if the idle revolution ratio is smaller than 1 and the engagement capacity is set to 0 if the idle revolution ratio is equal to or greater than 1.

According to the present invention, when an engine starting request is issued during the electric travelling, the internal combustion engine revolution speed is prevented from being decreased even a load is increased before the internal combustion engine is actually started and it is unnecessary to compute an engagement capacity required for starting the internal combustion engine; accordingly, it is possible to obtain an effect of alleviating a load on the processing of engine starting control.

More specifically, in the first aspect of the present invention, when the motor revolution speed (Ms) is equal to or lower than the idle revolution speed (Ei) of the internal combustion engine, if the engagement ratio is less than 1, the lower the engagement ratio is, the larger the engagement capacity is set. When the motor revolution speed (Ms) is greater than the idle revolution speed (Ei) of the internal combustion engine, if the idle revolution ratio is less than 1, the lower the idle revolution ratio is, the larger the engagement capacity is set. Thereby, even a load is increased before the internal combustion engine is actually started; the motor can output a corresponding torque so as to prevent the internal combustion revolution speed (Ne) from decreasing. Moreover, the engagement capacity is set as mentioned in the above, it is not necessary to compute the engagement capacity required for starting the internal combustion engine.

When the internal combustion revolution speed (Ne) increases gradually and becomes equal to the motor revolution speed (Ms), the engagement device is released to ignite the internal combustion engine; therefore, even though a torque is not transmitted from the motor, it is possible to start the internal combustion engine.

The above-mentioned effect of the present invention can be obtained either by setting the engagement capacity greater as the engagement ratio becomes smaller if the engagement is smaller than 1 or by setting the engagement capacity greater as the idle revolution ratio becomes smaller if the idle revolution ratio is smaller than 1.

In other words, according to the second aspect of the present invention, if the motor revolution speed (Ms) is determined to be equal to or lower than the idle revolution speed (Ei), the engine starting control device controls the starting of the internal combustion engine at the low speed mode in which the engagement capacity is set greater as the engagement ratio becomes smaller than if the engagement ratio is smaller 1 and the engagement capacity is set to 0 if the engagement ratio is equal to or greater than 1. According to the third aspect of the present invention, if the motor revolution speed (Ms) is determined to be equal to or lower than the idle revolution speed (Ei), the engine starting control device controls the starting of the internal combustion engine at the high speed mode in which the engagement capacity is set greater as the idle revolution ratio becomes smaller if the idle revolution ratio is smaller than 1 and the engagement capacity is set to 0 if the idle revolution ratio is equal to or greater than 1. According to either the second aspect or the third aspect of the present invention, even a load is increased before the internal combustion engine is actually started; the motor can output a corresponding torque so as to prevent the internal combustion revolution speed (Ne) from decreasing.

In the second aspect or the third aspect of the present invention, it is preferable that the engine starting control device controls the motor to generate a torque having the engagement capacity set at the low speed mode or at the high speed mode added to a required driving force necessary for starting the internal combustion engine during the electric travelling (Fourth aspect).

According to the fourth aspect of the present invention, the motor can output a torque with the engagement capacity added to the required driving force; thus, even under a relatively greater load, the internal combustion engine revolution speed can be prevented from decreasing.

In either one of the first aspect to the fourth aspect of the present invention, the engine starting request is configured to be issued, for example, when a travelling speed of the vehicle is greater than a predetermined engine starting allowable speed (Fifth aspect). According thereto, the starting control is performed after the vehicular speed is equal to or greater than the engine starting allowable speed, which further assures the starting of the internal combustion engine.

In either one of the first aspect to the fifth aspect of the present invention, it is preferable that the hybrid vehicle is provided with a power device for transmitting the power force from the driving sources to driving wheels via two paths with different transmission ratio, the motor is connected to either one of the two paths, and if the motor revolution speed (Ms) is determined to be equal to or lower than the idle revolution speed (Ei) of the internal combustion engine, the engine starting control device changes a connection path to the motor from the connected path to the other one and determines whether or not the motor revolution speed (Ms) transmitted from the motor via the connection path is equal to or lower than the idle revolution speed (Ei) of the internal combustion engine (Sixth aspect).

According thereto, the power device transmits the power force from the driving sources to the driving wheels via two paths. Since the transmission gear ratio is different for each path, the motor revolution speed (Ms) transmitted from the motor to the internal combustion engine according to the path also changes. Thereby, even the motor revolution speed (Ms) is equal to or lower than the idle revolution speed (Ei) of the internal combustion engine, by determining whether or not the motor revolution speed (Ms) to be transmitted to the internal combustion engine from the motor via the other path which is not yet being connected is equal to or lower than the idle revolution speed (Ei) of the internal combustion engine, it is possible to start the internal combustion engine at an appropriate revolution speed.

In the sixth aspect of the present invention, in either one of the case where a SOC (State Of Charge) of a power source of the motor is equal to or lower than a predetermined value, or a case where a temperature of the motor is equal to or greater than a predetermined value or the motor is malfunctioning, or in the both cases, it is preferable that the engine starting control device changes a connection path to be connected to the motor and starts the internal combustion engine via the connection path (Seventh aspect).

According to the seventh aspect of the present invention, in a state where the motor is unable to operate normally (for example, in a case where the SOC of the power source of the motor is equal to or lower than the predetermined value or in a case where a temperature of the motor is equal to or greater than the predetermined value or the motor is malfunctioning), the engine control device changes a connection path which is not being connected to the motor yet and starts the internal combustion engine via the connection path. According thereto, in spite of the state of the motor, it is possible to set the motor revolution speed (Ms) to be transmitted to the internal combustion engine at a revolution speed appropriate for starting the internal combustion engine.

MODE FOR CARRYING OUT THE INVENTION

Figure 1:
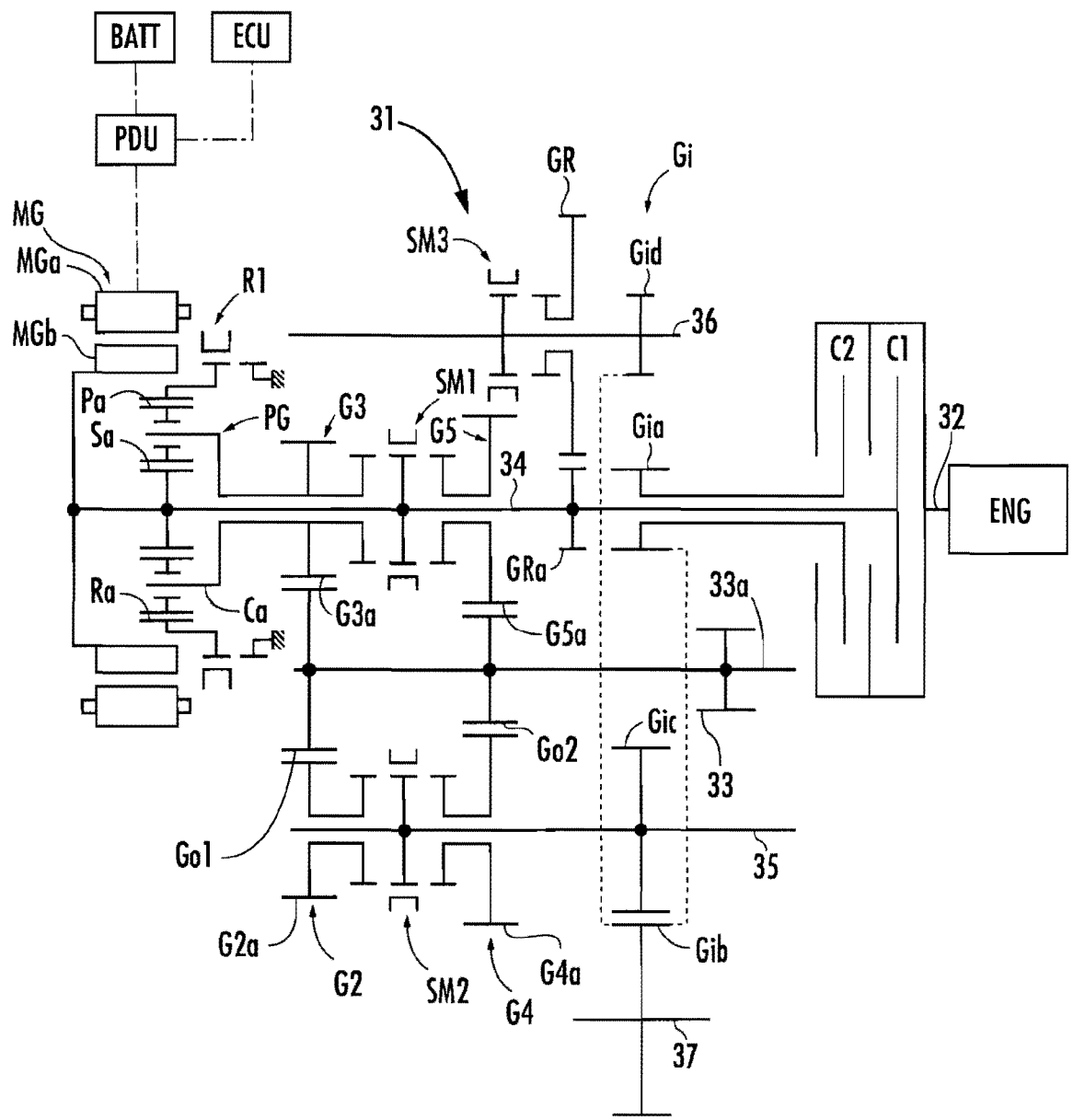
FIG. 1 is a diagram illustrating a configuration of a power device of a hybrid vehicle disposed with an engine starting control device of the present invention.

FIG. 1 illustrates a configuration of a power device mounted on a hybrid vehicle disposed with an engine starting control device of the present invention.

The power device is provided with an automatic transmission 31, an internal combustion engine (engine) ENG, an electric motor (motor/generator) MG, and is configured to transmit the power from the engine ENG through an input shaft 32 to the transmission 31 and meanwhile transmit the power from the motor MG through a planetary gear mechanism PG to the transmission 31 so as to be able to drive a wheel shaft which is driven rotationally according to the power output from an output member 33 of the transmission 31 through a differential gear unit.

The engine ENG in the power device is an internal combustion engine which is configured to generate power (torque) by combusting fuels such as gasoline, light oil, alcohol and the like and has an output shaft (crank shaft) to output the generated power to the outside therethrough. Similar to a common engine in a vehicle, the engine controls an opening degree of a throttle valve disposed in an intake air passage (not shown) (in other words, controls an intake air amount by the engine) to adjust the power output from the engine through the output shaft.

The automatic transmission 31 is provided with the input shaft 32 for transmitting the driving force (output torque) from the engine ENG, the output member 33 composed of output gears for outputting the power to laterally disposed front wheels serving as the driving wheels via the differential gear unit (not shown), a train of plural gears G2 to G5 having different gear ratios.

The automatic transmission 31 is also provided with a first input shaft 34 for pivotally supporting drive gears G3a and G5a rotationally of the respective odd-numbered gear trains G3 and G5 for establishing odd-numbered speeds in the gear ratio order, a second input shaft 35 for pivotally supporting drive gears G2a and G4a rotationally of the respective even-numbered gear trains G2 and G4 for establishing even-numbered speeds in the gear ratio order, and a reverse shaft 36 for pivotally supporting a reverse gear GR rotationally. The first input shaft 34 is disposed at the same shaft line as an engine output shaft. The second input shaft 35 and the reverse shaft 36 are disposed in parallel to the first input shaft 34.

The automatic transmission 31 is further provided with an idle gear train Gi composed of an idle drive gear Gia which is pivotally supported on the first input shaft 34 rotationally, a first idle driven gear Gib which is fixed on an idle shaft 37 and is configured to intermesh with the idle drive gear Gia, a second idle driven gear Gic which is fixed on the second input shaft 35, and a third idle driven gear Gid which is fixed on the reverse shaft 36 and is configured to intermesh with the first idle driven gear Gib. The idle shaft 37 is disposed in parallel to the first input shaft 34.

The automatic transmission 31 is further provided with a first clutch C1 and a second clutch C2, each of which may be a hydraulic-actuated dry friction clutch or a hydraulic-actuated wet friction clutch. The first clutch C1 is configured to switch between a transmission state in which the driving force transmitted from the engine ENG to the engine output shaft is transmitted to the first input shaft 34 after the transmission ratio is changed and a released state in which the driving force transmission is disabled. The second clutch C2 is configured to switch between a transmission state in which the driving force transmitted from the engine ENG to the engine output shaft is transmitted to the second input shaft 35 after the transmission ratio is changed and a released state in which the driving force transmission is disabled. When the second clutch C2 is engaged to achieve the transmission state, the engine output shaft 2 is coupled with the second input shaft 35 through the first idle driven gear Gib and the second idle driven gear Gic.

It is preferable that both of the clutches C1 and C2 are actuated by an electric actuator so as to be switched from one state to the other quickly. In addition, it is acceptable that both of the clutches C1 and C2 are actuated by a hydraulic actuator.

The automatic transmission 31 is disposed with the planetary gear mechanism PG which is a differential revolution mechanism positioned coaxially with the engine output shaft. The planetary gear mechanism PG is a single pinion gear mechanism composed of a sun gear Sa, a ring gear Ra and a carrier Ca which rotatably and revolvably supports a pinion Pa intermeshing with the sun gear Sa and the ring gear Ra.

If three rotating elements composed of the sun gear Sa, the carrier Ca and the ring gear Ra of the planetary gear mechanism PG are defined as a first rotating element, a second rotating element and a third rotating element from the left side in the order in which they are arranged at intervals corresponding to gear ratios in the velocity diagram (in which the relative rotating speed of each rotating element is denoted by a straight line), then, the first rotating element corresponds to the sun gear Sa, the second rotating element corresponds to the carrier Ca and the third rotating element corresponds to the ring gear Ra.

If the gear ratio (the number of teeth of the ring gear Ra/the number of teeth of the sun gear Sa) of the planetary gear mechanism PG is set as g, then, the ratio of a distance between the sun gear Sa which is the first rotating element and the carrier Ca which is the second rotating element with respect to a distance between the carrier Ca which is the second rotating element and the ring gear Ra which is the third rotating element is g: 1.

The sun gear Sa which is the first rotating element is fixed on the first input shaft 34. The carrier Ca which is second rotating element is coupled with the 3rd-speed drive gear G3a in the 3rd-speed gear train G3. The ring gear Ra which is the third rotating element is releasably fixed to a fixed member such as the transmission case by a lock mechanism R1.

The lock mechanism R1 is a synchromesh mechanism which can freely switch the ring gear Ra between a fixed state where the ring gear Ra is fixed to the fixed member and a released state where the ring gear Ra is freely rotatable.

The lock mechanism R1 is not limited to a synchromesh mechanism, it may be a mechanism which is engaged or released according to friction from a sleeve or the like, a brake such as a wet multi-plate brake, a hub brake, a hand brake or the like, a 1-way clutch, a 2-way clutch or the like. It is also acceptable that the planetary gear mechanism PG is a double pinion gear mechanism composed of a sun gear, a ring gear and a carrier which rotatably and revolvably supports a pair of pinion Pa and Pa' which are intermeshing with each other and one pinion is intermeshing with the sun gear and the other one is intermeshing with the ring gear. In this case, for example, it is acceptable that the sun gear (the first rotating element) is fixed on the first input shaft 34, the ring gear (the second rotating element) is coupled with the 3rd-speed drive gear G3a of the 3rd-speed gear train G3, and the carrier (the third rotating element) is releasably fixed to the fixed member through the lock mechanism R1.

The motor MG which is hollow inside is disposed outside to the planetary gear mechanism PG in the radial direction. In other words, the planetary gear mechanism PG is disposed inside the hollow motor MG. The motor MG is provided with a stator MGa and a rotor MGb.

The motor MG is controlled via a PDU (Power Drive Unit) on the basis of an instruction signal from an ECU. The ECU is configured to appropriately switch the PDU between a driving state where the motor MG is driven by consuming the electric power from a storage battery BATT and a regenerative state where the storage battery BATT is charged via the PDU by the electric power generated by restricting the rotating force of the rotor MGb.

A low voltage battery (not shown) supplies the electric power of a voltage of 12V to vehicular appliances of the vehicle. According to control signals from the ECU, it is possible to use the electric power from the storage battery BATT to charge the low voltage battery via a DC/DC converter (now shown).

A current sensor is configured to detect the value of a current flowing in the motor MG, and the ECU receives the current value detected by the current sensor as a signal via the PDU.

A first driven gear Go1 intermeshing with a 2nd-speed drive gear G2a and a 3rd-speed drive gear G3a is fixed on an output shaft 33a which pivotally supports the output member 33. A second driven gear Go2 intermeshing with a 4th-speed drive gear G4a and a 5th-speed drive gear G5a is also fixed on the output shaft 33a.

As above-mentioned, by configuring a single gear Go1 as a driven gear for the 2nd-speed gear train G2 and the 3rd-speed gear train G3 and a single gear Go2 as a driven gear for the 4th-speed gear train G4 and the 5th-speed gear train G5, respectively, it is possible to reduce the shaft length of the automatic transmission, which makes it more convenient to mount the automatic transmission to an FF (Front-Engine Front-Wheel Drive) type vehicle.

The first input shaft 34 is fixed with a reverse driven gear GRa intermeshing with the reverse gear GR.

The first input shaft 34 is disposed with a first intermeshing mechanism SM1 which is composed of a synchromesh mechanism serving as a first selector for switching freely to either state among a 3rd-speed side coupled state in which the 3rd-speed drive gear G3a and the first input shaft 34 are coupled, a 5th-speed side coupled state in which the 5th-speed drive gear G5a and the first input shaft 34 are coupled, a neutral state in which the 3rd-speed drive gear G3a and the 5th-speed drive gear G5a are uncoupled from the first input shaft 34, and a first gear speed established state in which the lock mechanism R1 is locked.

The second input shaft 35 is disposed with a second intermeshing mechanism SM2 which is composed of a synchromesh mechanism serving as a second selector for switching freely to either state among a 2nd-speed side coupled state in which the 2nd-speed drive gear G2a and the second input shaft 35 are coupled, a 4th-speed side coupled state in which the 4th-speed drive gear G4a and the second input shaft 35 are coupled, and a neutral state in which the 2nd-speed drive gear G2a and the 4th-speed drive gear G4a are uncoupled from the second input shaft 35.

The reverse shaft 36 is disposed with a third intermeshing mechanism SM 3 which is composed of a synchromesh mechanism for switching freely to any state between a coupled state in which the reverse gear GR and the reverse shaft 36 are coupled and a neutral state in which the reverse gear GR is uncoupled from the reverse shaft 36.

The automatic transmission 31 in FIG. 1 is a transmission of 5 gear speeds; however, it may be a transmission of 7 gear speeds with the number of gears added.

Hereinafter, the operations of the automatic transmission 31 having the configuration mentioned in the above will be described.

In the automatic transmission 31, when the first clutch C1 is engaged, it is possible to start the engine ENG by using the driving force from the motor MG.

1) Establish the First Gear Speed by Using the Driving Force of the Engine ENG

The ring gear Ra of the planetary gear mechanism PG is locked by the lock mechanism R1 to the fixed state and the first clutch C1 is engaged to enable the transmission state.

Thereby, the driving force of the engine ENG is input to the sun gear Sa of the planetary gear mechanism PG via the engine output shaft, the first clutch C1 and the first input shaft 34, and is transmitted to the 3rd-speed drive gear G3a via the carrier Ca with the revolution speed of the engine ENG input from the engine output shaft being reduced to $1/(g+1)$.

The driving force transmitted to the 3rd-speed drive gear G3a is output from the output member 33 via the first driven gear Go1 and the output shaft 33a with the revolution speed thereof being shifted to $1/i(g+1)$, the first gear speed is established. Herein, "i" is referred to as a gear ratio of the 3rd-speed gear train G3 composed of the 3rd-speed drive gear G3a and the first driven gear Go1 (the number of teeth of the 3rd-speed drive gear G3a/the number of teeth of the first driven gear Go1).

As above-mentioned, in the automatic transmission 31, it is possible to establish the first gear speed by using the planetary gear mechanism PG and the 3rd-speed gear train, therefore, there is no necessity to have a special intermeshing mechanism for establishing the first gear speed. Thereby, by disposing the planetary gear mechanism PG capable of establishing the first gear speed in the motor MG, it is possible to reduce the shaft length of the automatic transmission.

In the first gear speed, the vehicle is in a deceleration state and the ECU performs a regenerative deceleration operation which generates the electric power by braking the motor MG according to the residual capacity (charging rate) SOC of the storage battery BATT. Moreover, according to the SOC of the storage battery BATT, it is possible for the vehicle to perform an HEV (Hybrid Electric Vehicle) travelling in which the motor MG is driven to assist the driving force of the engine ENG, or an EV (Electric Vehicle) travelling in which the vehicle travels by the driving force from the motor MG only.

Further, when the vehicle is in the EV travelling, the deceleration of the vehicle is allowed and the vehicular velocity is equal to or greater than a predetermined velocity, by gradually engaging the first clutch C1, the engine ENG can be started by the kinetic energy of the vehicle without using the driving force of the motor MG.

Furthermore, when the ECU predicts that the vehicle travelling at the first gear speed may be shifted up to the second gear speed according to the vehicle information such as the vehicular velocity, the manipulated amount of an accelerator pedal and the like, the second intermeshing mechanism SM2 is set to the 2nd-speed side coupled state in which the 2nd-speed drive gear G2a and the second input shaft 35 are coupled or a pre-shift state nearby the 2nd-speed side coupled state.

2) Establish the Second Gear Speed by Using the Driving Force of the Engine ENG

The second intermeshing mechanism SM2 is set to the 2nd-speed side coupled state in which the 2nd-speed drive gear G2a and the second input shaft 35 are coupled and the second clutch C2 is engaged to enable the transmission state.

Thereby, the driving force of the engine ENG is output from the output member 33 via the second clutch C2, the idle gear train Gi, the second input shaft 35, the 2nd-speed gear train G2 and the output shaft 33a.

In the second gear speed, when the ECU predicts a shift-up in the gear speed, the first intermeshing mechanism SM1 is set to the 3rd-speed side coupled state in which the 3rd-speed drive gear G3a and the first input shaft 34 are coupled or a pre-shift state nearby the 3rd-speed side coupled state.

On the other hand, when the ECU predicts a shift-down in the gear speed, the first intermeshing mechanism SM1 is set to the neutral state in which the 3rd-speed drive gear G3a and the first input shaft 34 are uncoupled and the lock mechanism R1 is locked to the fixed state to establish the first gear speed by the planetary gear mechanism PG.

Thus, only by setting the first clutch C1 at the transmission state and the second clutch C2 at the released state, it is possible to perform the shift-up or the shift-down in the gear speed smoothly without interrupting the driving force.

In the second gear speed, the ECU performs the regenerative deceleration operation according to the residual capacity SOC of the storage battery BATT when the vehicle is in the deceleration state; however, the regenerative deceleration operation is different when the first intermeshing mechanism SM1 is in the 3rd-speed side coupled state or in the neutral state.

Specifically, when the first intermeshing mechanism SM1 is in the 3rd-speed side coupled state, the 3rd-speed drive gear G3a is rotated by the first driven gear Go1 which is rotated by the 2nd-speed drive gear G2a, and the 3rd-speed drive gear G3a rotates the rotor MGb of the motor MG via the first input shaft 34; thus, the regeneration is performed to generate the electric power by braking the rotor MGb to inhibit the revolution thereof.

On the other hand, when the first intermeshing mechanism SM1 is in the neutral state, the revolution speed of the ring gear Ra is equal to "0" since it is locked to the fixed state by the lock mechanism R1; thus, the regeneration is performed by braking the carrier Ca rotating together with the 3rd-speed drive gear G3a which intermeshes with the first driven gear Go1 to make the motor MG which is coupled with the sun gear Sa to generate the electric power.

To achieve the HEV travelling at the second gear speed, for example, the driving force of the motor MG is transmitted to the output member 33 via the 3rd-speed gear train G3 under the condition that each rotating element in the planetary gear mechanism PM is unable to make relative rotation which is achieved by setting the first intermeshing mechanism SM1 to the 3rd-speed side coupled state in which the 3rd-speed drive gear G3a and the first input shaft 34 are coupled and setting the lock mechanism R1 to the released state. Or by setting the first intermeshing mechanism SM1 to the neutral state, locking the ring gear Ra to the fixed state by the lock mechanism R1 so that the revolution speed thereof is equal to "0", and transmitting the driving force of the motor MG to the first driven gear Go1 via the first gear speed path to achieve the HEV travelling at the second gear speed.

3) Establish the Third Gear Speed by Using the Driving Force of the Engine ENG

The first intermeshing mechanism SM1 is set to the 3rd-speed side coupled state in which the 3rd-speed drive gear G3a and the first input shaft 34 are coupled and the first clutch C1 is engaged to enable the transmission state.

Thereby, the driving force of the engine ENG is transmitted to the output member 33 via the engine output shaft 2, the first clutch C1, the first input shaft 34, the first intermeshing mechanism SM1 and the 3rd-speed gear train G3, and is output at a revolution speed of 1/i of the engine revolution speed.

In the third gear speed, since the first intermeshing mechanism SM1 is set to the 3rd-speed side coupled state in which the 3rd-speed drive gear G3a and the first input shaft 34 are coupled, the sun gear Sa and the carrier Ca of the planetary gear mechanism PG rotate identically.

Thus, either when each rotating element of the planetary gear mechanism PG is unable to rotate relatively or when the regenerative deceleration is performed at the motor MG by braking the sun gear Sa, if the driving force of the motor MG can be transmitted to the sun gear Sa, it is possible to perform the HEV travelling. Moreover, it is possible to release the first clutch C1 to perform the EV travelling by the driving force from the motor MG only.

In the third gear speed, when the ECU predicts a shift-down in the gear speed according to the vehicle information such as the vehicular velocity, the manipulated amount of the accelerator pedal and the like, the second intermeshing mechanism SM2 is set to the 2nd-speed side coupled state in which the 2nd-speed drive gear G2a and the second input shaft 35 are coupled or a pre-shift state nearby the 2nd-speed side coupled state; on the other hand, when the ECU predicts that a shift-up in the gear speed, the second intermeshing mechanism SM2 is set to the 4th-speed side coupled state in which the 4th-speed drive gear G4a and the second input shaft 35 are coupled or a pre-shift state nearby the 4th-speed side coupled state.

Thus, only by engaging the second clutch C2 to the transmission state and releasing the first clutch C1 to the released state, it is possible to perform the gear shifting so as to shift gears smoothly without interrupting the driving force.

4) Establish the Fourth Gear Speed by Using the Driving Force of the Engine ENG

The second intermeshing mechanism SM2 is set to the 4th-speed side coupled state in which the 4th-speed drive gear G4a and the second input shaft 35 are coupled and the second clutch C2 is engaged to enable the transmission state.

Thereby, the driving force of the engine ENG is output from the output member 33 via the second clutch C2, the idle gear train G1, the second input shaft 35, the 4th-speed gear train G4 and the output shaft 33a.

During travelling at the fourth gear speed, when the ECU predicts a shift-down in the gear speed according to the vehicle information, the first intermeshing mechanism SM1 is set to the 3rd-speed side coupled state in which the 3rd-speed drive gear G3a and the first input shaft 34 are coupled or a pre-shift state nearby the 3rd-speed side coupled state.

On the other hand, when the ECU predicts a shift-up in the gear speed according to the vehicle information, the first intermeshing mechanism SM1 is set to the 5th-speed side coupled state in which the 5th-speed drive gear G5a and the first input shaft 34 are coupled or a pre-shift state nearby the 3rd-speed side coupled state. Thus, only by engaging the first clutch C1 to the transmission state and releasing the second clutch C2 to the released state, it is possible to perform the shift-up or the shift-down in the gear speed so as to shift gears smoothly without interrupting the driving force.

In case the regenerative deceleration or the HEV travelling is performed during travelling at the fourth gear speed, when the ECU predicts a shift-down, the first intermeshing mechanism SM1 is set to the 3rd-speed side coupled state in which the 3rd-speed drive gear G3a and the first input shaft 34 are coupled, the regenerative deceleration is achieved if the motor MG is braked and the HEV travelling is achieved if the driving force from the motor MG is transmitted.

When the ECU predicts a shift-up, the first intermeshing mechanism SM1 is set to the 5th-speed side coupled state in which the 5th-speed drive gear G5a and the first input shaft 34 are coupled, the regenerative deceleration is achieved if the motor MG is braked and the HEV travelling is achieved if the driving force from the motor MG is transmitted.

5) Establish the Fifth Gear Speed by Using the Driving Force of the Engine ENG

The first intermeshing mechanism SM1 is set to the 5th-speed side coupled state in which the 5th-speed drive gear G5a and the first input shaft 34 are coupled. In the fifth gear speed, since the first clutch C1 is set to the transmission state, the engine ENG and the motor MG are directly coupled, if the driving force is output from the motor MG, the HEV travelling is achieved; if the motor MG is braked to generate the electric power, the regenerative deceleration is achieved.

To achieve the EV travelling at the fifth gear speed, the first clutch C1 should be set to the released state. Moreover, during the EV travelling at the fifth gear speed, it is possible to start the engine ENG by gradually engaging the first clutch C1.

When the ECU predicts a shift-down to the fourth gear speed according to the vehicle information during travelling at the fifth gear speed, the second intermeshing mechanism SM2 is set to the 4th-speed side coupled state in which the 4th-speed drive gear G4a and the second input shaft 35 are coupled or a pre-shift state nearby the 4th-speed side coupled state. Thereby, it is possible to shift smoothly down to the fourth gear speed without interrupting the driving force.

6) Establish the Reverse Gear Speed by Using the Driving Force of the Engine ENG The lock mechanism R1 is set to the fixed state, the third intermeshing mechanism SM3 is set to the coupled state in which the reverse gear GR and the reverse shaft 36 are coupled, and the second clutch C2 is engaged to enable the transmission state. Thereby, the driving force of the engine output shaft is output from the output member 33 via the second clutch C2, the idle gear train Gi, the reverse gear GR, the reverse driven gear GRa, the sun gear Sa, the carrier Ca, the 3rd-speed gear train G3 and the output shaft 33a as a rotation to the rearward direction to establish the reverse gear speed.

As mentioned in the above, since the automatic transmission 31 in FIG. 1 is configured to perform the shift-up or shift-down without interrupting the driving force, it is possible to use the gears configured for another input shaft different from the input shaft being used currently despite that either gear speed is selected from the first gear speed to the fifth gear speed.

According to the automatic transmission 31 as mentioned above, as illustrated by the dashed line in FIG. 2, it is possible to establish a starting gear speed outputting a rotating speed lower than the normal first gear speed denoted by the solid line and to select an appropriate starting gear speed according to the vehicular state. Thereby, it is possible to improve the following capacity in response to the driver's operation (drivability) and the mileage.

Hereinafter, an engine starting control device according to an embodiment of the present invention will be described.

The engine starting control device according to the present embodiment is composed of the ECU stored with a computer program configured to perform the following control processes when an engine starting request is issued during the electric travelling in which the hybrid vehicle provided with the engine ENG and the motor MG illustrated in FIG. 1 is driven to travel by the driving force of the motor MG only.

First, a condition determination process for performing the engine starting control will be described.

Figure 3:
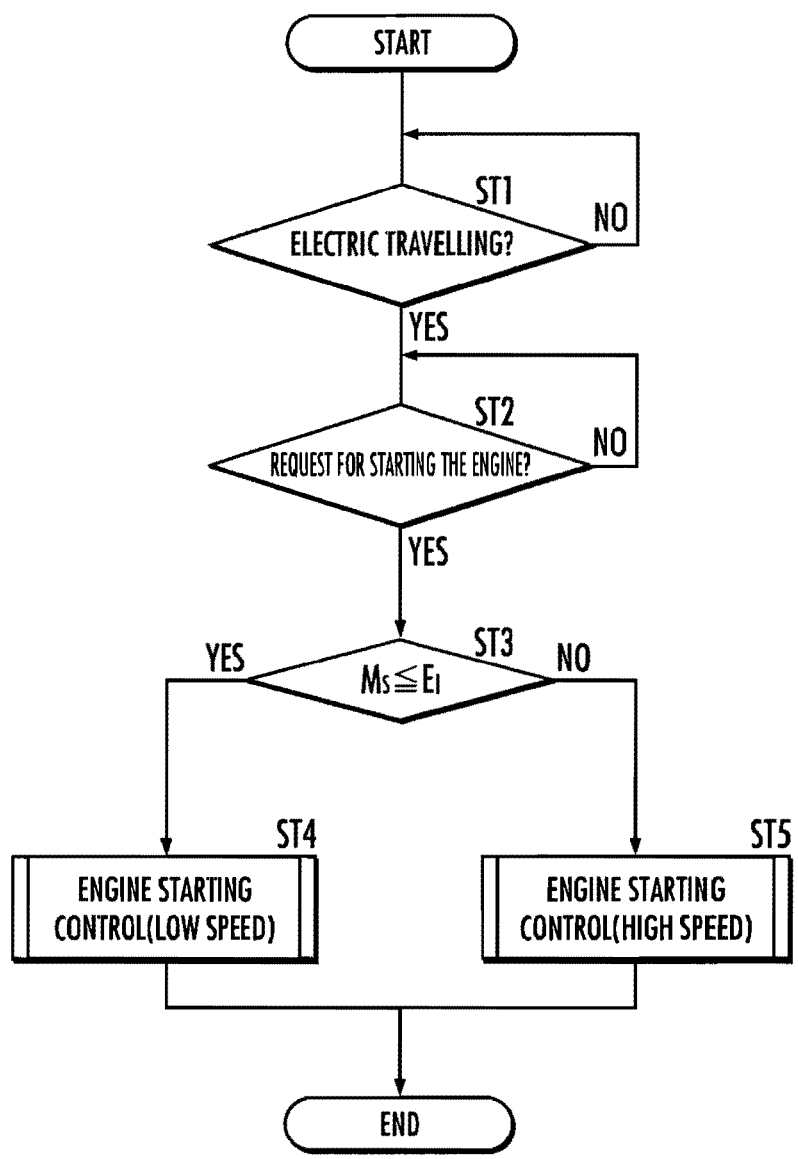
FIG. 3 is a flow chart illustrating a condition determination process for an engine starting control.

As illustrated in FIG. 3, firstly whether or not the vehicle is in the electric travelling is determined (ST1). If the determination result is negative, the process stands idle for the next determination. On the other hand, if it is determined that the vehicle is in the electric travelling, whether or not the engine starting request is issued is determined (ST2). In the present embodiment, it is configured that the engine starting request is determined to be issued when a vehicular speed V which is detected by a conventional detector and input to the ECU is greater than an engine starting allowable speed Vs; however, it is acceptable to determine the engine starting request by the other conditions.

If V≥Vs at ST2, it is determined that the engine starting request is issued. Subsequently, the ECU determines whether or not a revolution speed Ms (referred to as "motor revolution speed") transmitted from the motor MG to the first clutch C1 via the first input shaft 34 is equal to or lower than an idle revolution speed Ei of the engine ENG (ST3). If the determination result is that Ms≤Ei, the engine starting control is performed at a low speed mode (ST4); if the determination result is that Ms>Ei, the engine starting control is performed at a high speed mode (ST5). Hereinafter, the description is given on the engine starting control.

In the engine starting control at the low speed mode, if a clutch engagement ratio (engagement ratio of an engagement device) defined as a ratio of the engine revolution speed Ne with respect to the motor revolution speed Ms is smaller than 1, the lower the clutch engagement ratio is, the greater the clutch capacity (engagement capacity) is set; if the engagement ratio is equal to or greater than 1, the clutch capacity is set to 0.

Figure 4:
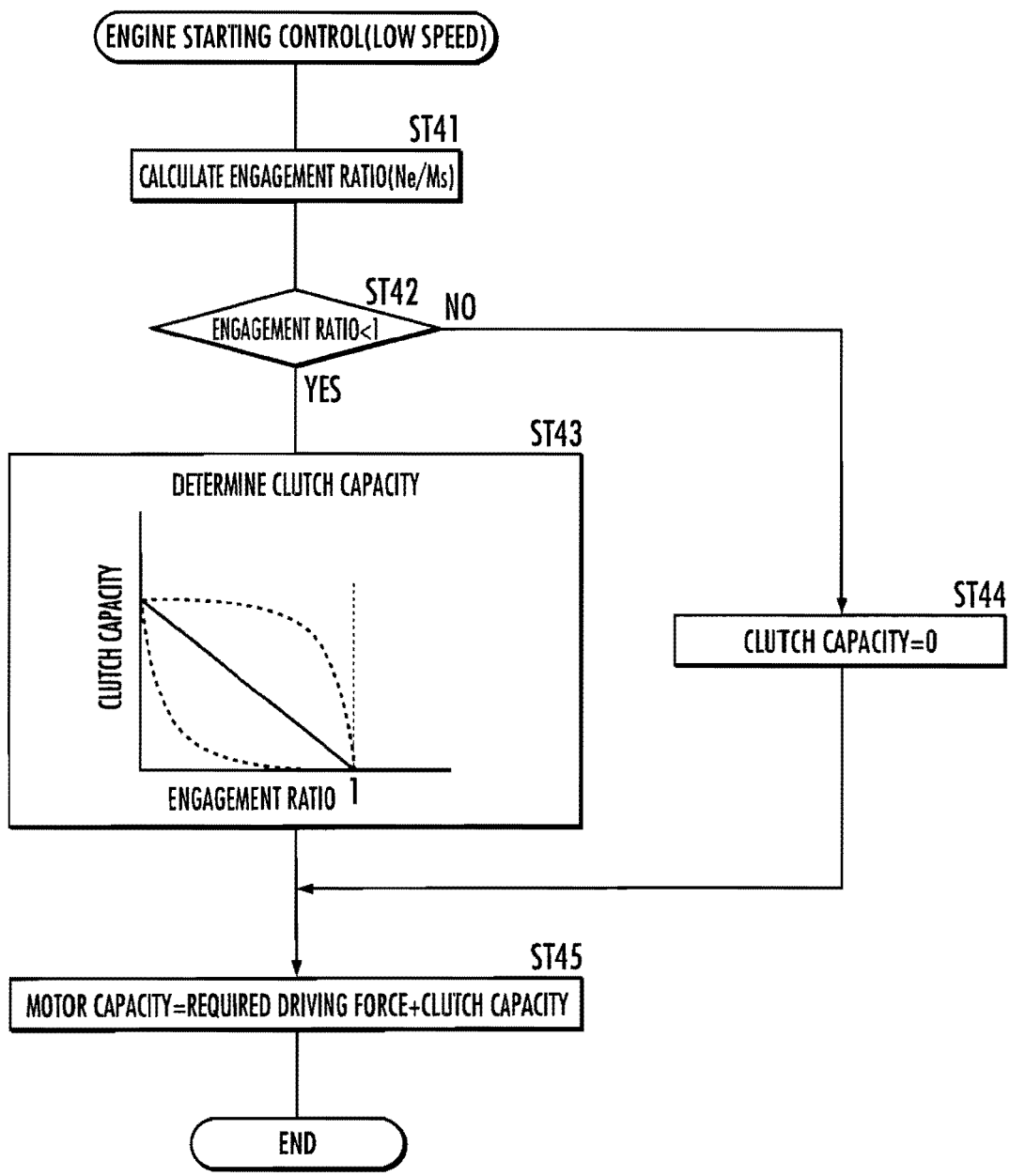
FIG. 4 is a flow chart illustrating an engine starting control process at a low speed mode where a motor revolution speed is equal to or lower than an idle revolution speed.

Specifically, as illustrated in FIG. 4, firstly, the engagement ratio is calculated (ST41). In other words, the engagement ratio is obtained from the motor revolution speed Ms which is detected by a predefined detector and input into the ECU and the engine revolution speed Ne.

Thereafter, whether or not the engagement ratio is smaller than 1 is determined (ST42). If the engagement ratio is smaller than 1, the clutch capacity is determined according to a predetermined relation between the engagement ratio and the clutch capacity (ST43). As illustrated by the graph in the block of ST43, when the engagement ratio is from 0 to 1, the clutch capacity and the engagement ratio are configured to have an inverse proportion relation (the solid line) in which the clutch capacity decreases along a straight line with the increment of the engagement ratio. It is also acceptable that the clutch capacity decreases along a curved line (2 dashed lines) but not the straight line. The relation may be set appropriately according to the result of a preliminarily performed experiment. In either case, the clutch capacity is set to a value greater as the engagement ratio becomes smaller if the engagement ratio is smaller than 1 according to the relation between the engagement ratio and the clutch capacity illustrated by the graph in the drawing.

On the other hand, if the engagement ratio is equal to 1 or more, the clutch capacity is set to 0 (ST44).

Thereafter, the clutch capacity determined in the above is added to a driving force required for the engine starting (required driving force) and the sum is set as the motor capacity (torque) (ST45), and the motor MG is controlled to output the torque.

Figure 6:
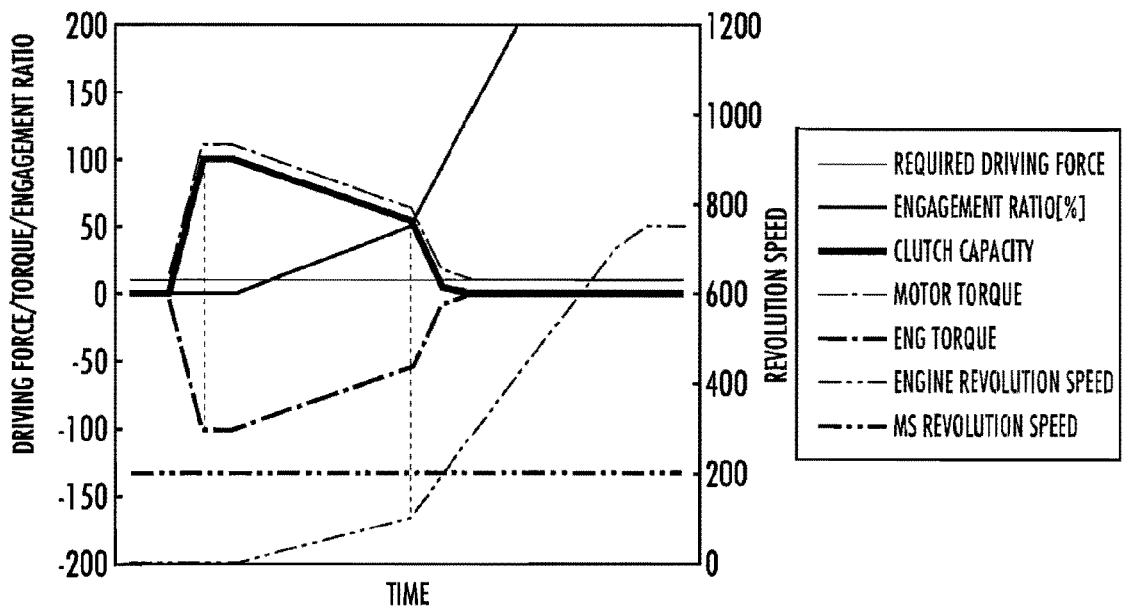
FIG. 6 is a chart illustrating a temporal changes of a required driving force, an engagement ratio, an engagement capacity and the like, respectively, at the starting of an internal combustion engine performed at the engine starting control process illustrated in FIG. 4.

According to the engine starting control at the low speed mode as mentioned in the above, in the engine starting, the required driving force, the engagement ratio, the clutch capacity, the motor torque, the engine torque, the engine revolution speed, the motor revolution speed vary with time respectively, as illustrated in FIG. 6.

On the other hand, if the idle revolution ratio defined as a ratio of the engine revolution speed Ne with respect to the idle revolution speed Ei is smaller than 1, the lower the idle revolution ratio is, the greater the clutch capacity is set; if the idle revolution ratio is equal to or greater than 1, the clutch capacity is set to 0.

Figure 5:
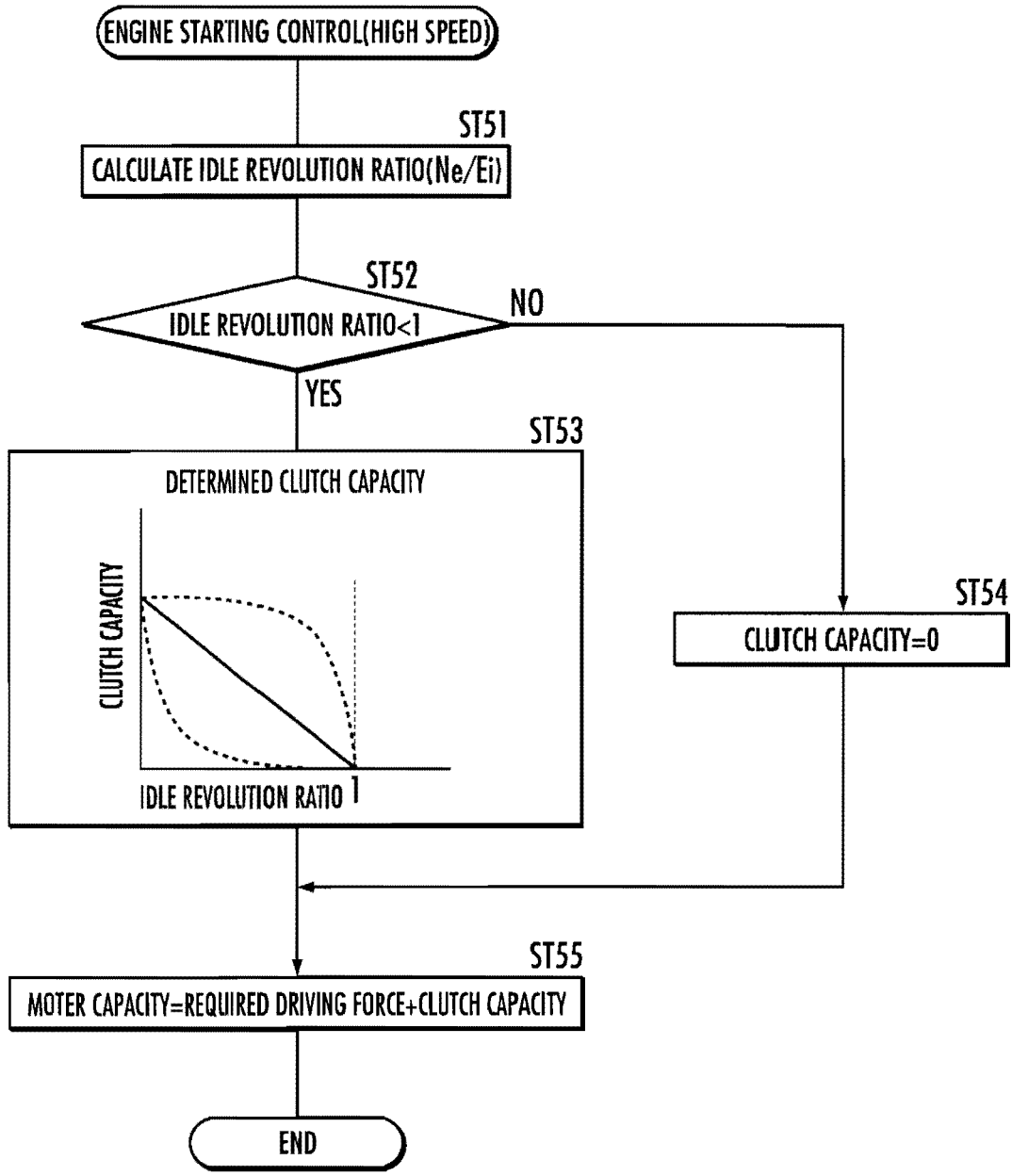
FIG. 5 is a flow chart illustrating an engine starting control process at a high speed mode where a motor revolution speed is greater than an idle revolution speed.

Specifically, as illustrated in FIG. 5, firstly, the idle revolution ratio is calculated (ST51). In other words, the idle revolution ratio is obtained from the idle revolution speed Ei which is detected by a predefined detector and input into the ECU and the engine revolution speed Ne.

Thereafter, whether or not the idle revolution ratio is smaller than 1 is determined (ST52). If the idle revolution ratio is smaller than 1, the clutch capacity is determined according to a predetermined relation between the idle revolution ratio and the clutch capacity (ST53). As illustrated by the graph in the block of ST53, when the idle revolution ratio is from 0 to 1, the clutch capacity and the idle revolution ratio are configured to have an inverse proportion relation (the solid line) in which the clutch capacity decreases along a straight line with the increment of the idle revolution ratio. It is also acceptable that the clutch capacity decreases along a curved line (2 dashed lines) but not the straight line. In either case, the clutch capacity is set to a value greater as the idle revolution ratio becomes smaller if the idle revolution ratio is smaller than 1 according to the relation between the idle revolution ratio and the clutch capacity illustrated by the graph in the drawing.

On the other hand, if the idle revolution ratio is equal to 1 or more, the clutch capacity is set to 0 (ST54).

Thereafter, the clutch capacity determined in the above is added to a driving force required for the engine starting (required driving force) and the sum is set as the motor capacity (ST55), and the motor MG is controlled to output the corresponding torque.

Figure 7:
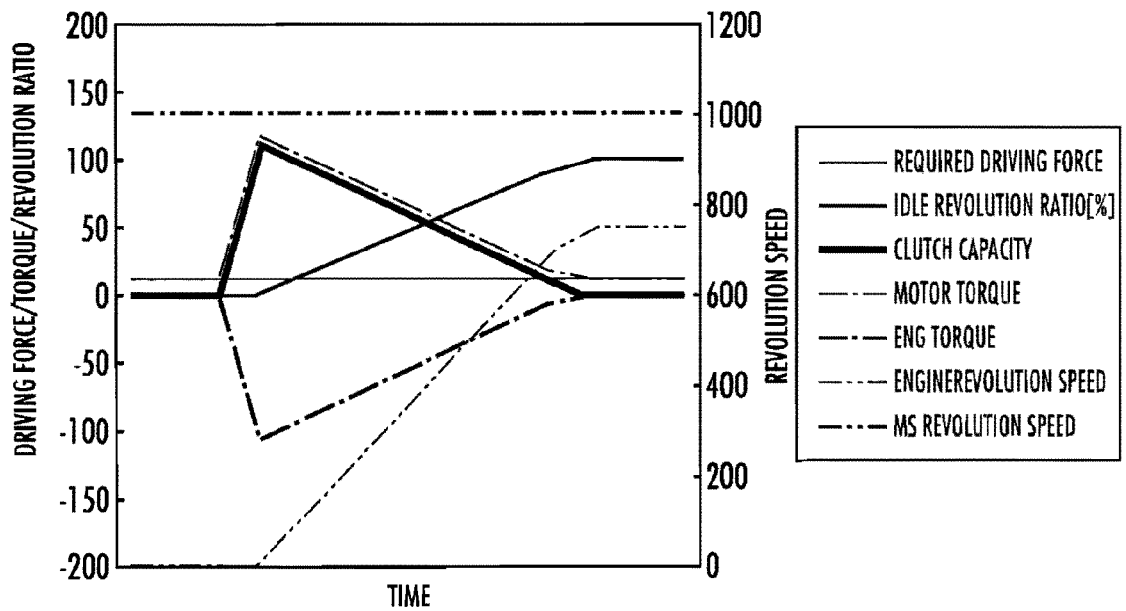
FIG. 7 is a chart illustrating a temporal changes of a required driving force, an engagement ratio, an engagement capacity and the like with time, respectively, at the starting of an internal combustion engine performed at the engine starting control process illustrated in FIG. 5.

According to the engine starting control at the high speed mode as mentioned in the above, in the engine starting, the required driving force, the engagement ratio, the clutch capacity, the motor torque, the engine torque, the engine revolution speed, the motor revolution speed vary with time respectively, as illustrated in FIG. 7.

Though the present embodiment has been described as in the above, the engine starting control device of the present invention is not limited to perform both the engine starting control at the low speed mode (FIG. 4) and the engine starting control at the high speed mode (FIG. 5), it is acceptable for it to process at least one of the engine starting controls.

According to the engine starting control device, when the motor revolution speed Ms is equal to or lower than the idle revolution speed Ei, if the ratio of the engine revolution speed Ne with respect to the motor revolution speed Ms is equal to 1, the clutch is set to an uncoupled state. However, by injecting fuels and igniting the injected fuels, it is possible to change the engine revolution speed Ne from a revolution speed at the time when the clutch is uncoupled to a revolution speed capable for steady operation. Here, since the clutch is in the uncoupled state, the torque variation of the engine ENG will not be transmitted to the wheel shaft (e.g., the wheels); moreover, it is possible to set the engine revolution speed Ne to any revolution speed which is not lower than the motor revolution speed Ms.

When the motor revolution speed Ms is greater than the idle revolution speed Ei, it is only necessary to detect the idle revolution speed Ei possible for the steady operation, which makes the control easy to be performed. Thereby, in the engine starting control, the computation on the transmission torque capacity of the clutch is unnecessary, which in turn prevents the processing load of the engine starting control device from increasing.

When the motor revolution speed Ms is greater than the idle revolution speed Ei, by uncoupling the clutch to the uncoupled state, it is possible to prevent the torque variation of the engine ENG from being transmitted to the wheel shaft.

Hereinafter, another embodiment of a condition determination process for performing the engine starting control in the power device configured as mentioned above will be described.

Figure 8:
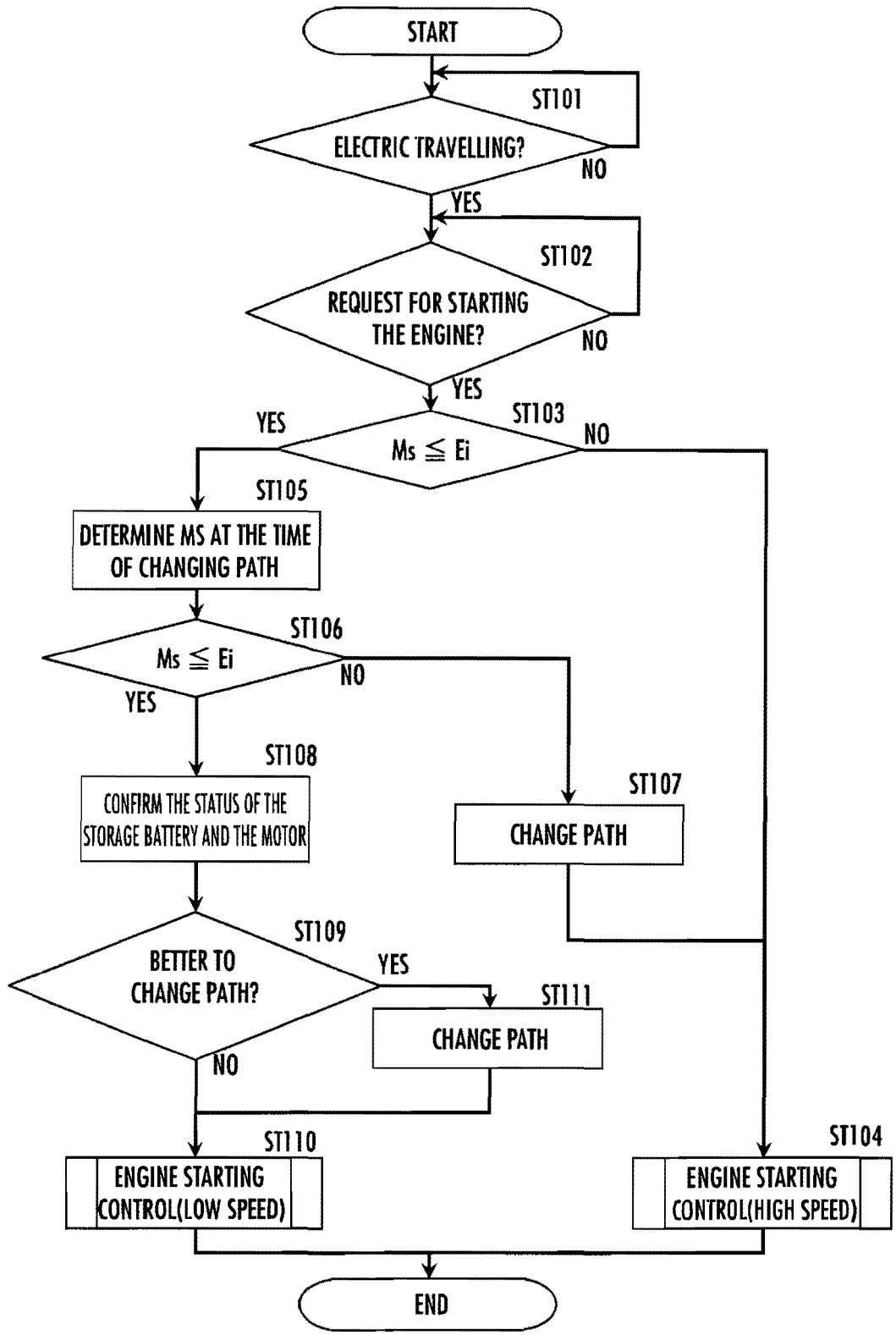
FIG. 8 is a flow chart illustrating a condition determination process for an engine starting control according to another embodiment.

FIG. 8 illustrates a flow chart of a condition determination process of another embodiment. Here, since ST101 to ST103 in the flow chart are identical to ST1 to ST3 in FIG. 3, the descriptions thereof will be omitted.

If the determination result of ST103 is Ms>Ei, the engine starting control is performed at the high speed mode (ST104). Since the process is identical to that performed at ST5 of FIG. 3, the description thereof is omitted.

If the determination result of ST103 is Ms≤Ei, the motor revolution speed Ms at the time when a transmission path is changed is calculated (ST105). In the automatic transmission 31 of FIG. 1, there are 2 transmission paths for transmitting the driving force from the driving source: a transmission path via the first input shaft 34 and the other transmission path via the second input shaft 35.

In the case of starting the engine via the path of the first input shaft 34 (hereinafter, referred to as the first path), either one of the first gear speed, the third gear speed and the fifth gear speed is established and the first clutch is engaged so as to transmit the rotation of the motor MG to the engine ENG. In the case of starting the engine via the path of the second input shaft 35 (hereinafter, referred to as the second path), either the second gear speed or the fourth gear speed is established and the second clutch C2 is engaged so as to transmit the rotation of the motor MG to the engine ENG.

As mentioned above, since the motor MG is coupled with the first input shaft 34, the revolution speed of the first input shaft 34 is equal to the motor revolution speed Ms. Further, when the first clutch C1 is engaged, the revolution speed of the engine output shaft 2 is equal to the motor revolution speed Ms. Thereby, in the starting the engine via the first path, the motor revolution speed Ms is equal to the revolution speed of the engine ENG.

On the other hand, the second input shaft 35 is coupled with the motor MG via the first input shaft 34, the 3rd-speed drive gear G3 or the 5th-speed drive gear G5, the first driven gear Go1 or the second driven gear Go2, and the 2nd-speed drive gear G2 or the 4th-speed drive gear G4. Further, when the second clutch C2 is engaged, the engine output shaft 2 is coupled with the second input shaft 35 via the idle gear train Gi. Thereby, in the case of starting the engine via the second path, the motor revolution speed Ms is changed to rotate the engine output shaft 2, the motor revolution speed Ms is different from the revolution speed of the engine ENG.

Thus, the motor revolution speed Ms transmitted to the engine ENG in the 2nd-speed side coupled state or in the 4th-speed side coupled state is calculated at ST105, and whether or not the motor revolution speed Ms is equal to or lower than the idle revolution speed Ei of the engine ENG is determined (ST106). The motor revolution speed Ms is calculated as follows. Each gear speed of the automatic transmission 31 or the transmission ratios of the idle gear trains is stored in a memory of the ECU preliminarily, and the motor revolution speed Ms transmitted to the engine ENG is calculated according to the actual revolution speed and the transmission ratios of the motor MG.

The first path and the second path are equivalent to two paths for transmitting the driving force of the driving sources to the driving wheels in the present invention. In the present invention, the process at ST 105 and ST106 is equivalent to changing the path being connected to the motor from one path to the other path and determining whether or not the motor revolution speed transmitted from the motor via the connected path is equal to or lower than the idle revolution speed of the engine.

If Ms>Ei, the path is changed (ST107), the engine starting control is performed at the high speed mode (ST104). At the time when the path is changed, if Ms>Ei at the 2nd-speed side coupled state, the path is set at the 4th-speed side coupled state; if Ms>Ei at the 4th-speed side coupled state, the path is kept at the 4th-speed side coupled state.

If Ms≤Ei, the state of the storage battery BATT and the state of the motor MG are confirmed (ST108), and whether or not the path should be changed to make the states better is determined (ST109). The details of ST108 and ST109 will be described hereinafter.

If it is determined that it is unnecessary to change the path, the engine starting control is performed at the low speed mode (ST110). On the other hand, if it is determined that it is better to change the path, the path is changed (ST111) and the engine starting control is performed at the low speed mode (ST110). Since the engine starting control at the low speed mode is identical to that performed at ST4 of FIG. 3, the description thereof is omitted herein.

The control process is terminated after the engine starting control at the low speed mode or at the high speed mode is terminated.

Hereinafter, the process performed at ST108 and ST109 mentioned above will be described.

If at least one of a case when the SOC of the storage battery BATT is equal to or lower than a predetermined value $\alpha$, a case when a temperature of the motor MG is equal to or greater than a predetermined temperature $\beta$, and a case when the motor MG is malfunctioning, it is determined to be better to change the path, and the engine ENG is started via the second path.

1) When the SOC of the Storage Battery BATT is Equal to or Lower than the Predetermined Value $\alpha$ The predetermined value $\alpha$ is set as a value for determining whether or not the SOC of the storage battery BATT is sufficient for continuing the EV travelling. Specifically, if the SOC of the storage battery BATT is equal to or lower than the predetermined value $\alpha$, it is not sufficient for continuing the EV travelling; thereby, it is preferable not to place a great load on the motor MG. In this case, in order to alleviate the load off from the motor MG, the current gear speed is shifted down to a lower gear speed and thereafter the engine is started.

For example, when the vehicle is in the EV travelling at the third gear speed, the path is changed to the second gear speed. Since the transmission ratio (a ratio obtained by dividing the input revolution speed by the output revolution speed) at the second gear speed is greater than that at the third gear speed, even though the revolution speed of the motor MG is the same, the revolution speed transmitted to the engine ENG at the second gear speed is greater than that at the third gear speed.

Thereby, without increasing the load on the motor MG, it is possible to increase the revolution speed transmitted to the engine ENG.

2) When the Temperature of the Motor MG is Equal to or Greater than the Predetermined Temperature $\beta$ Generally, the energy efficiency of the motor MG becomes worse at high temperature. This is because that the magnetic force for rotating the rotating shaft (the first input shaft 34) of the motor MG becomes smaller as the temperature becomes higher; thereby, the driving force output from the motor MG decreases.

In this case, as the load on the motor MG is increased, the energy loss increases, and consequently, the more fuel is consumed. Therefore, in order to increase the revolution speed transmitted to the engine ENG without increasing the load on the motor MG, the current gear speed is shifted down to a lower gear speed and thereafter the engine is started. Similar to the case when the SOC of the storage battery BATT is equal to or lower than the predetermined value $\alpha$, the transmission ratio herein becomes greater; thereby, even though the revolution speed of the motor MG is the same, the revolution speed transmitted to the engine ENG becomes greater.

Thereby, without increasing the load on the motor MG, it is possible to increase the revolution speed transmitted to the engine ENG, thereby to inhibit the increase of the fuel consumption.

3) When the Motor MG is Malfunctioning

As a malfunctioning state of the motor MG, the malfunction where the charging path from the motor MG to the storage battery BATT is unable to be opened (open malfunction) is assumed.

The open malfunction occurs when a contactor (magnetic contactor) for opening or closing the current to the motor MG malfunctions and is unable to be opened. In other words, when the open malfunction occurs, the power generation is always performed during the rotation of the motor MG, and the power charge is performed despite of the SOC of the storage battery BATT. Thereby, when the SOC of the storage battery BATT is high and it is further charged, it is highly possible to damage the storage battery BATT due to overcharge.

The determination on whether or not the open malfunction has occurred is performed by determining whether or not a value of the current of the motor MG detected by a current sensor (not shown) is beyond a predetermined range. If the current value is beyond the predetermined range, it is determined that the motor MG is in the malfunctioning state; otherwise, the motor MG is in the normal state.

When the open malfunction occurs, since the power generation is always performed in the rotation of the motor MG, it is necessary to prevent the storage battery BATT from being damaged due to overcharging. Thereby, in order to lower the SOC of the storage battery BATT, the engine is started by shifting the gear speed for the current travelling up to a higher gear speed so as to increase the load on the motor MG.

For example, when the vehicle is in the EV travelling at the third gear speed, the path is changed to the fourth gear speed. Since the transmission ratio at the fourth gear speed is smaller than that at the third gear speed, even though the revolution speed of the motor MG is the same, the revolution speed transmitted to the engine ENG at the fourth gear speed is smaller than that at the third gear speed. Thereby, the engine ENG can be started while lowering the SOC of the storage battery BATT.

Here, the open malfunction is given as a malfunction of the motor MG; however, it is acceptable to change to the second path so as to prevent the motor MG or the storage battery BATT from being damaged when the other malfunctions occur. When the other malfunctions occur, if it is better for the motor MG to have the load thereon increased, then an even gear speed having a smaller transmission ratio is selected (for example, shift-up from the third gear speed to the fourth gear speed), or if it is better for the motor MG to have the load thereon decreased, then an even gear speed having a greater transmission ratio is selected (for example, shift-down from the third gear speed to the second gear speed).

In the present invention, the path change to the second path according to the processes at ST108, ST109 and ST110 mentioned above is equivalent to the fact that either in a case where the power SOC of the power source of the motor is equal to or lower than a predetermined value or in a case where the temperature of the motor is equal to or greater than a predetermined temperature or the motor is malfunctioning or in the both cases, the connection path to the motor is changed and the engine is started via the connection path.

As mentioned above, even when the motor revolution speed Ms is equal to or lower than the idle revolution speed (Ei) of the engine ENG, in some cases, it is possible to start the engine ENG without increasing the load on the motor MG. Moreover, it is also possible to start the engine ENG so as to prevent the motor MG and the storage battery BATT from being damaged according to the state of the motor MG and the state of the storage battery BATT.

Figure 9:
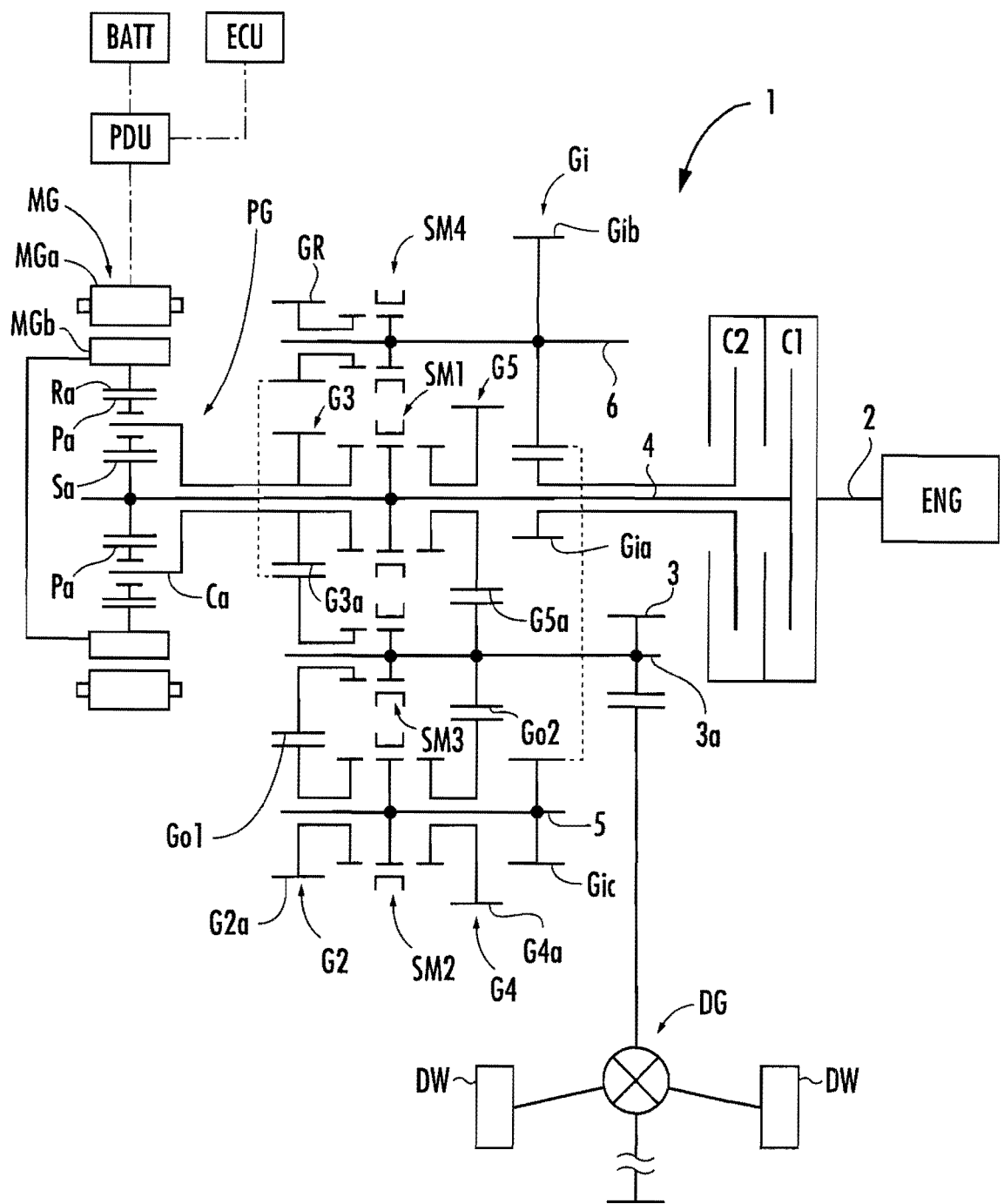
FIG. 9 is a diagram illustrating another configuration of a power device of a hybrid vehicle.

The power device controlled by the starting control device of the present invention is not limited to the configuration illustrated in FIG. 1, it may have a configuration as illustrated in FIG. 9.

The power device is provided with an automatic transmission 1, an internal combustion engine (engine) ENG, an electric motor (motor or generator) MG, and is configured to transmit the power from the engine ENG through an input shaft 2 to the transmission 1 and meanwhile transmit the power from the motor MG through a planetary gear mechanism PG to the transmission 1 so as to drive a pair of driving wheels DW and DW fixed on a wheel shaft which is rotationally driven by the power output from an output member 3 of the transmission 1 through a differential gear unit DG.

In the power device illustrated in FIG. 9, in addition to the input shaft 2 which rotates in couple with an engine output shaft and the output member 3 composed of output gears for outputting power, the automatic transmission 1 is provided with a train of plural gears G2 to G5 having different gear ratios, a first drive gear shaft 4 for pivotally supporting drive gears G3a and G5a rotationally of the respective odd-numbered gear trains G3 and G5 in the gear ratio order, a second drive gear shaft 5 for pivotally supporting drive gears G2a and G4a rotationally of the respective even-numbered gear trains G2 and G4 in the gear ratio order, a reverse shaft 6 for pivotally supporting a reverse gear GR rotationally, and an idle gear train Gi.

The idle gear train Gi is composed of an idle drive gear Gia which is pivotally supported on the first drive gear shaft 4 rotationally, a first idle driven gear Gib which is fixed on the reverse shaft 6 and is configured to intermesh with the idle drive gear Gia, and a second idle driven gear Gic which is fixed on the second drive gear shaft 5.

The first drive gear shaft 4 is disposed at the same shaft line as the input shaft 2. The second drive gear shaft 5 is disposed in parallel to the first drive gear shaft 4. The revolution of the input shaft 2 is releasably transmitted to the first drive gear shaft 4 via the clutch C1 or to the idle drive gear Gia via the second clutch C2. In other words, the revolution of the input shaft 2 is releasably transmitted to the second drive gear shaft 5 via the second clutch C2 and the idle gear train Gi.

The first clutch C1 and the second clutch C2 mentioned above are clutch mechanisms (equivalent to the engagement device of the present invention) composed of a friction engagement mechanism which operates so as to couple or uncouple the connection between the input shaft 2 of the transmission and the first drive gear shaft 4 or the second drive gear shaft 5 under the control by an ECU to be described hereinafter (capable of operating selectively between a coupled state and an uncoupled state).

A planetary gear mechanism PG is disposed coaxially with the first drive gear shaft 4. The planetary gear mechanism PG is a single pinion gear mechanism composed of a sun gear Sa, a ring gear Ra and a carrier Ca which rotatably and revolvably supports a pinion Pa intermeshing with the sun gear Sa and the ring gear Ra.

Figure 2:
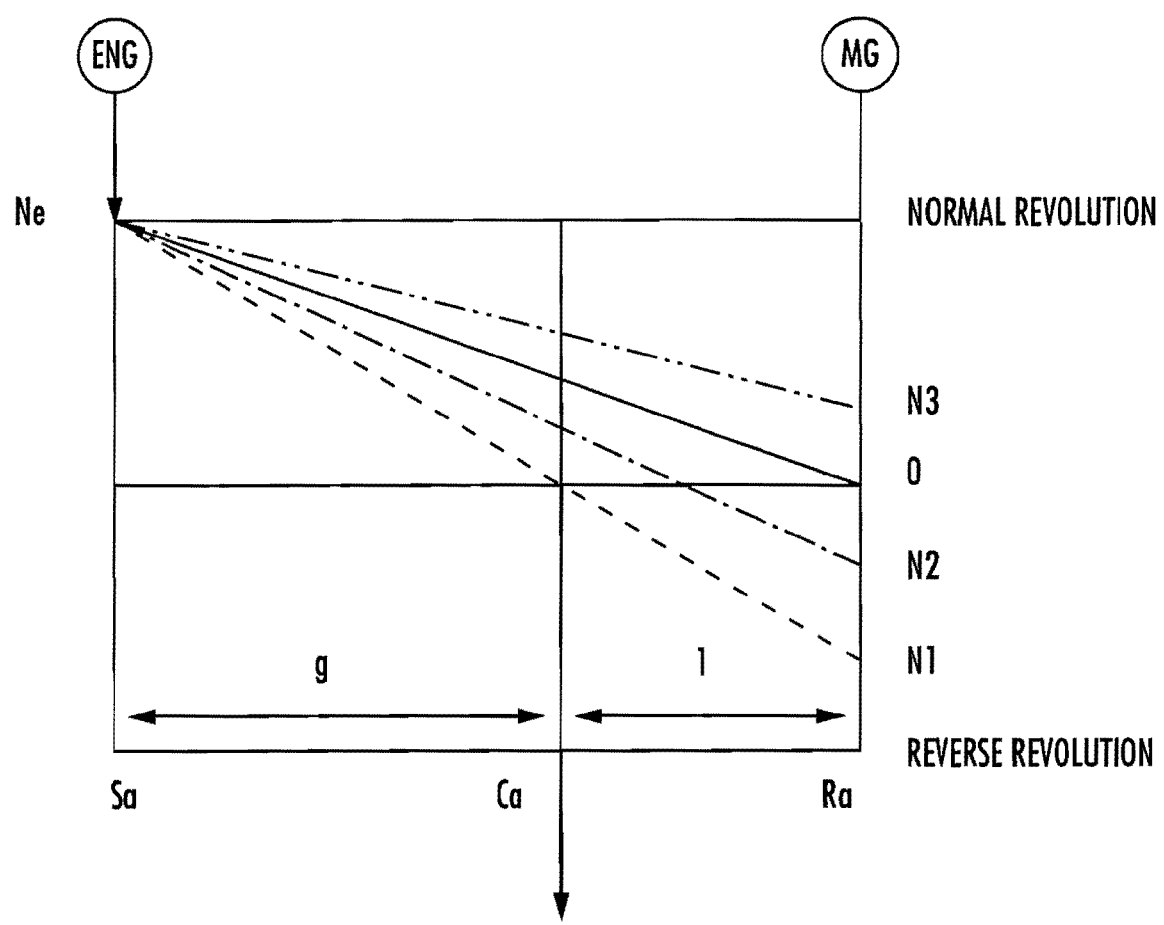
FIG. 2 is a velocity diagram of a switching mechanism disposed in the power device illustrated in FIG. 1.

If three rotating elements composed of the sun gear Sa, the carrier Ca and the ring gear Ra of the planetary gear mechanism PG are defined as a first rotating element, a second rotating element and a third rotating element from the left side in the order in which they are arranged at intervals corresponding to gear ratios in the velocity diagram of FIG. 2, then, the first rotating element corresponds to the sun gear Sa, the second rotating element corresponds to the carrier Ca and the third rotating element corresponds to the ring gear Ra.

The sun gear Sa which is the first rotating element is fixed on the first drive gear shaft 4. The carrier Ca which is second rotating element is coupled with the 3rd-speed drive gear G3a in the 3rd-speed gear train G3. The ring gear Ra which is the third rotating element is releasably fixed to the transmission case (not shown) by a brake.

The brake is constituted by a two-way clutch which can be switched between a state in which a normal revolution (revolution in the forward direction) is permitted and a reverse revolution (revolution in the backward direction) is inhibited and a state in which a normal revolution is inhibited while a reverse revolution is permitted. The brake B1 is not limited to the two-way clutch and may alternatively be constituted by other types, including a wet multi-plate brake, a hand brake or the like.

The motor MG is disposed on the outer side in the radial direction of the planetary gear mechanism PG. In other words, the planetary gear mechanism PG is disposed on the inner side of the hollow motor MG. In the present embodiment, the motor MG is a three-phase DC brushless motor and is provided with a rotor (rotating body) MGb rotationally supported in a hollow housing of the motor MG and a stator MGa fixed in the housing around the rotor. Plural permanent magnets are installed in the rotor MGb, and coils (armature winding) for three phases are installed in the stator MGa. The housing of the motor MG is fixed at a fixed member which is stationary with respect to the vehicle body, such as an outer case of the power device or the like.

The coils of the motor MG are electrically connected to a battery (BATT) which is a direct current power source via a power drive unit (PDU) which is a drive circuit including an inverter circuit. The PDU is electrically connected to an electronic control unit (ECU) configured to control operations of the power device including the motor MG. The ECU is configured to control the current in the coils via the PDU so as to adjust the power (torque) output by the motor MG from the rotor MGb. According to the control on the PDU, it is possible for the motor MG to perform a power operation which generates a power-operation torque in the rotor MGb according to the electric energy supplied from the battery, and a regenerative operation which generates power according to the mechanical energy (rotational energy) supplied to the rotor MGb via the planetary gear mechanism PG from the outside, and while charging the battery with the generated power, generates a regenerative torque (power-generation braking torque) in the rotor.

As mentioned above, the motor MG is controlled via the PDU on the basis of an instruction signal from the ECU which serves as a controller. The ECU is configured to appropriately switch the PDU between a driving state where the motor MG is driven by consuming the electric power from a secondary battery (BATT) and a regenerative state where the secondary battery BATT is charged via the PDU by the electric power generated by restricting the rotating force of the rotor MGb.

The ECU is an electronic circuit unit including a CPU, a RAM, a ROM, an interface circuit and the like, and is configured to control the operation of the power device by executing a control process defined by a program preliminarily installed. As functions realized by the control process of the ECU, in addition to the function of controlling the operation of the motor MG via the PDU (including the engine starting control performed thereby), the functions of controlling the operation of the engine via an engine-controlling actuator such as an actuator for a throttle valve (not shown) or the like, and a function of controlling the operations of the first clutch C1 and the second clutch C2 via an actuator or a drive circuit (not shown) may be given.

The reverse gear GR is pivotally supported on the reverse shaft 6 rotationally. A first driven gear Go1 intermeshing with the 2nd-speed drive gear G2a and the 3rd-speed drive gear G3a is pivotally supported on an output shaft 3a which pivotally supports the output member 3. A second driven gear Go2 intermeshing with the 4th-speed drive gear G4a and the 5th-speed drive gear G5a is also fixed on the output shaft 3a.

As above-mentioned, by configuring a driven gear for the 2nd-speed gear train G2 and the 3rd-speed 3rd-speed gear train G3, and a driven gear for the 4th-speed gear train G4 and the 5th-speed gear train G5, with a single gear Go1 and a single gear Go2, respectively, it is possible to reduce the shaft length of the automatic transmission, which makes it more convenient to mount the automatic transmission to an FF (Front-Engine Front-Wheel Drive) type vehicle.

The first drive gear shaft 4 is disposed with a first intermeshing mechanism SM1 which is composed of a synchromesh mechanism for switching freely to any state among the following three states: a coupled state in which the 3rd-speed drive gear G3a and the first drive gear shaft 4 are coupled; a coupled state in which the 5th-speed drive gear G5a and the first drive gear shaft 4 are coupled; and an uncoupled state in which the 3rd-speed drive gear G3a and the 5th-speed drive gear G5a are uncoupled from the first drive gear shaft 4.

The second drive gear shaft 5 is disposed with a second intermeshing mechanism SM2 which is composed of a synchromesh mechanism for switching freely to any state among the following three states: a coupled state in which the 2nd-speed drive gear G2a and the second drive gear shaft 5 are coupled; a coupled state in which the 4th-speed drive gear G4a and the second drive gear shaft 5 are coupled; and an uncoupled state in which the 2nd-speed drive gear G2a and the 4th-speed drive gear G4a are uncoupled from the second drive gear shaft 5.

The output shaft 3a is disposed with a third intermeshing mechanism SM3 which is composed of a synchromesh mechanism for switching freely to any state between a coupled state in which the first driven gear Go1 and the output shaft 3a are coupled and an uncoupled state in which the first driven gear Go1 is uncoupled from the output shaft 3a. The reverse shaft 6 is disposed with a fourth intermeshing mechanism SM4 which is composed of a synchromesh mechanism for switching freely to any state between a coupled state in which the reverse gear GR and the reverse shaft 6 are coupled and an uncoupled state in which the reverse gear GR is uncoupled from the reverse shaft 6.

Hereinafter, the operations of the automatic transmission 1 having the configuration mentioned in the above will be described. The operations below are performed under the control of the ECU.

Firstly, in establishing the first gear speed by using the driving force of the engine ENG, the first driven gear Go1 and the output shaft 3a are coupled by the third intermeshing mechanism SM3 and the first clutch C1 is engaged. Thereby, the driving force of the engine ENG is transmitted from the input shaft 2 to the sun gear Sa of the planetary gear mechanism PG via the first clutch C1 and the first drive gear shaft 4.

Here, if the gear ratio of the planetary gear mechanism PG (the number of teeth of the ring gear Ra/the number of teeth of the sun gear Sa) is defined as "g", the engine revolution speed input to the input shaft 2 is reduced to $1/(g+1)$ and is transmitted to the 3rd-speed drive gear G3a via the carrier Ca. If the gear ratio of the 3rd-speed gear train G3 composed of the 3rd-speed drive gear G3a and the first driven gear Go1 (the number of teeth of the 3rd-speed drive gear G3a/the number of teeth of the first driven gear Go1) is defined as "i", then the engine revolution speed is reduced to $1/i\,(g+1)$ and output from the output member 3. The first gear speed is thereby established.

In this situation, the regenerative operation is performed by braking the motor MG.

It is possible to perform an assist travelling in which the motor MG is driven to assist the driving force of the engine ENG or to perform the electric travelling (EV travelling) in which the vehicle is driven to travel by the driving force of the motor MG only. As will be described hereinafter, during the electric travelling, when the vehicular speed (V) is equal to or greater than an engine starting allowable speed Vs, it is defined that the engine starting request is issued, and the engine starting control can be performed. In the present embodiment, to start the engine ENG corresponds to the engine starting of the present invention.

Since the carrier Ca connected to the output member 3 has a remarkably greater inertia than the ring gear Ra connected to the rotor MGb of the motor MG; therefore, as illustrated by the dashed line in FIG. 2 (the velocity diagram of the planetary gear mechanism PG), in the starting, with respect to the revolution speed Ne of the sun gear Sa to which the power of the engine ENG is transmitted, the revolution speed of the carrier Ca is roughly equal to 0, and the ring gear Ra revolves reversely (revolution in the backward direction. Refer to N1 in FIG. 2). Then, the motor MG is braked such that the revolution speed of the ring gear Ra is changed from N1 to N2 to perform the regenerative operation to generate power, a driving force toward the normal revolution side (in the forward direction) is generated in the carrier Ca (Refer to the chain line in FIG. 2). Thereby, a starting gear speed having a lower output velocity and a greater driving force (torque) than the normal first gear speed is established.

If a driving force toward the normal revolution side is generated by the motor MG, the driving force of the engine ENG and the driving force of the motor MG are combined at the carrier Ca and output from the output member 3. Thereby, it is easy to output a greater driving force, which improves the capability of following an operation by a driver (drivability).

When the ECU predicts that the vehicle travelling at the first gear speed may be shifted up to the second gear speed according to the vehicle information such as the vehicular velocity and the like, the 2nd-speed drive gear G2a and the second drive gear shaft 5 are coupled by the second intermeshing mechanism SM2 to a coupled state or a pre-shift state approximating to the aforesaid state.

In the pre-shift state, each drive gear (G2a, G3a, G4a or G5a) and each drive gear shaft (4 or 5) are coupled to a coupled state, and a clutch (C1 or C2) engaging the coupled drive gear shaft and the engine ENG is set to an uncoupled state. For example, in the pre-shift state of the second gear speed, the 2nd-speed drive gear G2a and the second drive gear shaft 5 are coupled by the second intermeshing mechanism SM2 and the second clutch C2 is uncoupled.

To establish the second gear speed by using the driving force of the engine ENG, the second intermeshing mechanism SM2 is set to the coupled state in which the 2nd-speed drive gear G2a and the second drive gear shaft 5 are coupled, the third intermeshing mechanism SM3 is set to the coupled state in which the first driven gear Go1 and the output shaft 3 are coupled, and the second clutch C2 is engaged.

In the second gear speed, when the ECU predicts a shift-up in the gear speed, the first intermeshing mechanism SM1 is set to the coupled state in which the 3rd-speed drive gear G3a and the first drive gear shaft 4 are coupled or a pre-shift state approximating the aforesaid state.

When the vehicle is decelerating and the state of charge SOC of the second battery BATT is less than a predetermined value, the ECU performs a regenerative deceleration operation. In the regenerative deceleration at the second gear speed, the power regeneration is performed by braking the carrier Ca rotating together with the 3rd-speed drive gear G3a which intermeshes with the first driven gear Go1 to make the motor MG which is coupled with the ring gear Ra to generate the electric power.

Here, when the ECU predicts a shift-up in the gear speed, the regenerative deceleration may be performed by braking the motor MG by setting the first intermeshing mechanism SM1 to the coupled state in which the 3rd-speed drive gear G3a and the first drive gear shaft 4 are coupled, and locking the three elements in the planetary gear mechanism PG to inhibit relative rotation.

Thereby, even when the vehicle is changed immediately from the deceleration state to the acceleration state, it is possible to shift up to the third gear speed rapidly.

In the assist travelling by the motor MG, the first intermeshing mechanism SM1 is set to the coupled state in which the 3rd-speed drive gear G3a and the first drive gear shaft 4 are coupled, the planetary gear mechanism PG is set to the locked state, and the driving force of the motor MG is transmitted to the output member 3 via the 3rd-speed gear train G3.

To establish the third gear speed by using the driving force of the engine ENG, the 3rd-speed drive gear G3a and the first drive gear shaft 4 are coupled by the first intermeshing mechanism SM1, and the first clutch C1 is engaged. Thereby, the driving force of the engine is transmitted from the input shaft 2 to the output member 3 via the first clutch C1, the first drive gear shaft 4, the first intermeshing mechanism SM1 and the 3rd-speed drive gear G3, and is output at a revolution speed of 1/i.

In the third gear speed, since the first intermeshing mechanism SM1 is set to the 3rd-speed side coupled state in which the 3rd-speed drive gear G3a and the first drive gear shaft 4 are coupled, the sun gear Sa and the carrier Ca of the planetary gear mechanism PG rotate identically. Thus, since each rotating element of the planetary gear mechanism PG is in the locked state where relative rotation is inhibited, if the brake is applied by the motor MG to the sun gear Sa or the ring gear Ra, the regenerative deceleration is performed, and if the driving force of the motor MG is transmitted to the sun gear Sa or the ring gear Ra, it is possible to perform the assist travelling.

Moreover, it is possible to release the first clutch C1 to perform the EV travelling in which the vehicle is driven to travel by the driving force of the motor MG only.

When the ECU predicts a shift-down in the gear speed according to the vehicle information, the second intermeshing mechanism SM2 is set to the coupled state in which the 2nd-speed drive gear G2a and the second drive gear shaft 5 are coupled or to a pre-shift state approximating the aforesaid state; on the other hand, when the ECU predicts a shift-up in the gear speed, the second intermeshing mechanism SM2 is set to the coupled state in which the 4th-speed drive gear G4a and the drive gear shaft 5 are coupled or a pre-shift state approximating the aforesaid state. Thus, only by engaging the second clutch C2 and releasing the first clutch C1, it is possible to perform the gear change so as to change the vehicular velocity smoothly.

To establish the fourth gear speed by using the driving force of the engine ENG, the 4th-speed drive gear G4a and the second drive gear shaft 5 are coupled by the second intermeshing mechanism SM2 and the second clutch C2 is engaged. During travelling in the fourth gear speed, when the ECU predicts a shift-down in the gear speed according to the vehicle information, the first intermeshing mechanism SM1 is set to the 3rd-speed side coupled state in which the 3rd-speed drive gear G3a and the first drive gear shaft 4 are coupled to the coupled state or to a pre-shift state approximating the aforesaid state, and the third intermeshing mechanism SM3 is set to the coupled state in which the first driven gear Go1 and the output shaft 3a are coupled.

On the other hand, when the ECU predicts a shift-up in the gear speed according to the vehicle information, the 5th-speed drive gear G5a and the first drive gear shaft 4 are coupled by the first intermeshing mechanism SM1 to the coupled state or a pre-shift state approximating the aforesaid state. Thus, only by engaging the first clutch C1 and releasing the second clutch C2, it is possible to perform the shift-up or the shift-down in the gear speed so as to perform the shift transmission smoothly.

If the regenerative deceleration or the assist travelling is performed during travelling at the fourth speed, when the ECU predicts a shift-down, the 3rd-speed drive gear G3a and the first drive gear shaft 4 are coupled by the first intermeshing mechanism SM1, and the first driven gear Go1 and the output shaft 3a are coupled by the third intermeshing mechanism SM3.

Further, if the regenerative deceleration is performed, the motor MG is braked to perform the regenerative deceleration. If the assist travelling is performed, the motor MG is driven and the driving force thereof is transmitted from the first drive gear shaft 4 to the output member 3 via the 3rd-speed gear train.

When the ECU predicts a shift-up in the gear speed, the 5th-speed drive gear G5a and the first drive gear shaft 4 are coupled by the first intermeshing mechanism SM1 to the coupled state. If the regenerative deceleration is performed, the brake is applied by the motor MG to perform the regenerative deceleration. If the assist travelling is performed, the driving force of the motor MG is transmitted to the output member 3 via the first drive gear shaft 4 and the 5th-speed gear train.

To establish the fifth gear speed by using the driving force of the engine ENG, the 5th-speed drive gear G5a and the first drive gear shaft 4 are coupled by the first intermeshing mechanism SM1 to the coupled state.

In the case of performing the regeneration or the assist travelling by using the motor MG or performing the EV travelling by using the driving force of the motor MG only, the first clutch C1 is released. During the EV travelling, the engine ENG may be started as to be described hereinafter.

When the ECU predicts a shift-down in the gear speed according to the vehicular information, the 4th-speed drive gear G4a and the second drive gear shaft 5 are coupled by the second intermeshing mechanism SM2 to the coupled state or a pre-shift state approximating to the aforesaid state. Thereby, the shift-down can be performed smoothly.

On the other hand, if the shift-down is not predicted according to the vehicular information, and the state of charge SOC of the second battery BATT is less than a predetermined value, and the vehicle is travelling in the acceleration state or a cruise (constant velocity) state, the 2nd-speed drive gear G2a and the second drive gear shaft 5 are coupled by the second intermeshing mechanism SM2, and the ring gear Ra is rotated by the motor MG at a predetermined revolution speed. In this situation, by engaging the second clutch C2 and releasing the first clutch C1, the driving force of the engine ENG is transmitted to the carrier Ca in the planetary gear mechanism PG via the idle gear train Gi, the second drive gear shaft 5, the second intermeshing mechanism SM2, the 2nd-speed gear train G2 and the 3rd-speed gear train G3.

At this time, by braking the ring gear Ra to generate the electric power by the motor MG, the driving force of the engine is distributed to the sun gear Sa coupled with the output member 3 and the ring gear Ra. As illustrated by the velocity diagram in FIG. 2, the interval between the sun gear Sa and the carrier Ca is greater than the interval between the carrier Ca and the ring gear Ra, therefore, the driving force transmitted from the engine to the carrier Ca is difficult to be transmitted to the sun gear Sa coupled with the output member 3. Thereby, it is possible to improve the mileage.

If the shift-down is not predicted according to the vehicular information, and the state of charge SOC of the second battery BATT is greater than the predetermined value, and the vehicle is in the EV travelling at the acceleration state or a cruise (constant velocity) state, the ECU can start the engine by engaging the first clutch C1.

Thereafter, the first clutch C1 is released, the revolution speed of the ring gear Ra is set to 0 and the 2nd-speed drive gear G2a and the second drive gear shaft 5 are coupled by the second intermeshing mechanism SM2. Then, the second clutch C2 is engaged, the driving force of the engine ENG is transmitted to the carrier Ca to enable the assist travelling.

To establish the reverse gear speed by using the driving force of the engine ENG, the third intermeshing mechanism SM3 is set to the coupled state in which the 2nd-speed drive gear G2a and the output shaft 3a are coupled, a fourth intermeshing mechanism SM4 is set to the coupled state in which the reverse gear GR and the reverse shaft 6 are coupled, and the second clutch C2 is engaged. Thereby, the revolution speed of the input shaft 2 is changed to a negative revolution (revolution in the reverse direction) of the revolution speed of [the number of teeth of an idle drive gear Gia/the number of teeth of a first idle driven gear Gib]×[the number of teeth of the reverse gear GR/the number of teeth of the first driven gear Go1], and the resulting revolution speed is output from the output member 3.

In the case of performing the regenerative deceleration or the assist travelling at the reverse gear speed, the first intermeshing mechanism SM1 is set to the coupled state in which the 3rd-speed drive gear G3a and the first drive gear shaft 4 are coupled, and the planetary gear mechanism PG is locked to the locked state. Then, if the rotor MGb which is revolving reversely is made to generate a driving force toward the normal revolution direction (if it is braked), the regenerative deceleration is achieved; if the driving force is generated toward the reverse revolution direction, the assist travelling is achieved.

Although the present invention has been explained in the above according to the embodiments but is not limited thereto, it is to be understood that other possible modifications and variations made without departing from the spirit and scope of the invention will be comprised in the present invention.

Industrial Applicability

The engine starting control device of the present invention is suitable for being mounted and used in a hybrid vehicle.

What is claimed is:

1. An engine starting control device for a hybrid vehicle provided with an internal combustion engine and a motor as power sources which engages an engagement device installed between the motor and the internal combustion engine and starts the internal combustion engine with a power force from the electric motor during an electric travelling of the hybrid vehicle driven by a driving force from the motor only, when an engine starting request is issued during the electric travelling, the engine starting control device determines whether or not a motor revolution speed (Ms) transmitted from the motor to the engagement device is equal to or lower than an idle revolution speed (Ei) of the internal combustion engine, if the motor revolution speed (Ms) is determined to be equal to or lower than the idle revolution speed (Ei), the engine starting control device controls the starting of the internal combustion engine at a low speed mode in which an engagement capacity is set greater as an engagement ratio defined as a ratio of an internal combustion engine revolution speed (Ne) with respect to the motor revolution speed (Ms) becomes smaller if the engagement ratio is smaller than 1 and the engagement capacity is set to 0 if the engagement ratio is equal to or greater than 1, and if the motor revolution speed (Ms) is determined to be greater than the idle revolution speed (Ei), the engine starting control device controls the starting of the internal combustion engine at a high speed mode in which the engagement capacity is set greater as an idle revolution ratio defined as a ratio of the internal combustion engine revolution speed (Ne) with respect to the idle revolution speed (Ei) becomes smaller if the idle revolution ratio is smaller than 1 and the engagement capacity is set to 0 if the idle revolution ratio is equal to or greater than 1.

2. An engine starting control device for a hybrid vehicle provided with an internal combustion engine and a motor as power sources which engages an engagement device installed between the motor and the internal combustion engine and starts the internal combustion engine with a power force from the electric motor during an electric travelling of the hybrid vehicle driven by a driving force from the motor only, when an engine starting request is issued during the electric travelling, the engine starting control device determines whether or not a motor revolution speed (Ms) transmitted from the motor to the engagement device is equal to or lower than an idle revolution speed (Ei) of the internal combustion engine, and if the motor revolution speed (Ms) is determined to be equal to or lower than the idle revolution speed (Ei), the engine starting control device controls the starting of the internal combustion engine at a low speed mode in which an engagement capacity is set greater as an engagement ratio defined as a ratio of an internal combustion engine revolution speed (Ne) with respect to the motor revolution speed (Ms) becomes smaller if the engagement ratio is smaller than 1 and the engagement capacity is set to 0 if the engagement ratio is equal to or greater than 1.

3. An engine starting control device for a hybrid vehicle provided with an internal combustion engine and a motor as power sources which engages an engagement device installed between the motor and the internal combustion engine and starts the internal combustion engine with a power force from the electric motor during an electric travelling of the hybrid vehicle driven by a driving force from the motor only, when an engine starting request is issued during the electric travelling, the engine starting control device determines whether or not a motor revolution speed (Ms) transmitted from the motor to the engagement device is equal to or lower than an idle revolution speed (Ei) of the internal combustion engine, and if the motor revolution speed (Ms) is determined to be greater than the idle revolution speed (Ei), the engine starting control device controls the starting of the internal combustion engine at a high speed mode in which the engagement capacity is set greater as an idle revolution ratio defined as a ratio of the internal combustion engine revolution speed (Ne) with respect to the idle revolution speed (Ei) becomes smaller if the idle revolution ratio is smaller than 1 and the engagement capacity is set to 0 if the idle revolution ratio is equal to or greater than 1.

4. The engine starting control device according to claim 2, wherein the engine starting control device controls the motor to generate a torque having the engagement capacity set at the low speed mode or at the high speed mode added to a required driving force for starting the internal combustion engine during the electric travelling.

5. The engine starting control device according to claim 1, wherein the engine starting request is issued when a travelling speed of the vehicle is greater than a predetermined engine starting allowable speed.

6. The engine starting control device according to claim 1, wherein the hybrid vehicle is provided with a power device for transmitting the power force from the power sources to driving wheels via two paths with different transmission ratio, the motor is connected to either one of the two paths, and if the motor revolution speed (Ms) is determined to be equal to or lower than the idle revolution speed (Ei) of the internal combustion engine, the engine starting control device changes a connection path to the motor from the connected path to the other one and determines whether or not the motor revolution speed (Ms) transmitted from the motor via the connection path is equal to or lower than the idle revolution speed (Ei) of the internal combustion engine.

7. The engine starting control device according to claim 6, wherein in either one of the case where a SOC of a power of the motor is equal to or lower than a predetermined value, or a case where a temperature of the motor is equal to or greater than a predetermined value or the motor is malfunctioning, or in the both cases, the engine starting control device changes a connection path to be connected to the motor and starts the internal combustion engine via the connection path.

\* \* \* \* \*